United States Patent
Kamakura

(10) Patent No.: US 8,862,890 B2
(45) Date of Patent: Oct. 14, 2014

(54) METHOD AND APPARATUS FOR PROCESSING BIOMETRIC INFORMATION

(75) Inventor: Ken Kamakura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 702 days.

(21) Appl. No.: 12/727,695

(22) Filed: Mar. 19, 2010

(65) Prior Publication Data

US 2010/0275258 A1    Oct. 28, 2010

(30) Foreign Application Priority Data

Mar. 26, 2009  (JP) .................................. 2009-75899

(51) Int. Cl.
*G06F 21/00*   (2013.01)
*G06F 21/32*   (2013.01)
*H04L 9/32*   (2006.01)

(52) U.S. Cl.
CPC .............. *G06F 21/32* (2013.01); *H04L 9/3231* (2013.01)
USPC ........... 713/186; 713/150; 713/159; 713/170; 713/172; 713/185; 726/5; 726/9; 726/18; 382/115; 382/116; 382/124

(58) Field of Classification Search
CPC .................... G06Q 20/40145; G07C 9/00087; G07C 9/00158; H04L 9/32
USPC ........................................................ 713/186
See application file for complete search history.

(56) References Cited

U.S. PATENT DOCUMENTS

| 7,574,734 B2 * | 8/2009 | Fedronic et al. ................... 726/9 |
| 2007/0177773 A1 * | 8/2007 | Hu et al. ........................ 382/119 |
| 2007/0219801 A1 | 9/2007 | Sundaram et al. |
| 2008/0059805 A1 * | 3/2008 | Yoshioka et al. .............. 713/186 |

FOREIGN PATENT DOCUMENTS

| EP | 1 357 520 A2 | 10/2003 |
| EP | 1 901 239 A2 | 3/2008 |
| JP | 2008-77518 | 4/2008 |
| JP | 2008-79680 | 4/2008 |
| WO | 91/08555 | 6/1991 |

OTHER PUBLICATIONS

Uludag, Umut, Arun Ross, and Anil Jain. "Biometric Template Selection and Update: A Case Study in Fingerprints." Pattern Recognition, vol. 37, No. 7, pp. 1533-1542, Jul. 2004.*
European Extended Search Report for application No. 10157417.6 dated Jul. 22, 2010.

* cited by examiner

*Primary Examiner* — Kambiz Zand
*Assistant Examiner* — Narciso Victoria
(74) *Attorney, Agent, or Firm* — Staas & Halsey LLP

(57) ABSTRACT

A biometric-information processing apparatus and method including storing sample biometric information of a user each time biometric authentication processing for verifying sample biometric information of a user against enrolled biometric information registered in a first storage unit succeeds, where the user's sample biometric information is stored in a second storage unit, and selecting an update-candidate biometric information for updating the user's enrolled biometric information from the user's sample biometric information stored in the second storage unit, based on a result of verification of multiple pieces of the user's sample biometric information stored in the second storage unit against enrolled biometric information of other users.

18 Claims, 21 Drawing Sheets

| MANAGEMENT ID | USER ID | TEMPORARY BIOMETRIC DATA | TIMESTAMP |
|---|---|---|---|
| 010001 | test001 | X7c6T2r4B3u2G4b1W6a0 | 2008/05/04 09:10 |
| 010002 | test002 | 6n1o3i7q5w5t8l1h6t5t | 2008/05/04 10:19 |
| 010003 | test001 | Q3k2G1l9U9s5T8w8O6x0 | 2008/05/06 09:05 |
| ⋮ | ⋮ | ⋮ | ⋮ |

FIG.18

| TIME PERIOD | 0 | 1 | 2 | 3 | 4 | 5 | 6 | ... | 22 | 23 |
|---|---|---|---|---|---|---|---|---|---|---|
| NUMBER OF EXECUTIONS OF VERIFICATION PROCESSING | 0 | 0 | 0 | 0 | 0 | 28 | 116 | ... | 5 | 0 |
| EXECUTION SETTING INFORMATION | ENABLE | ENABLE | ENABLE | M | M | ENABLE | ENABLE | ... | M | ENABLE |

312a

METHOD AND APPARATUS FOR PROCESSING BIOMETRIC INFORMATION

CROSS-REFERENCE TO RELATED APPLICATIONS

This application is based upon and claims the benefit of priority of the prior Japanese Patent Application No. 2009-75899, filed on Mar. 26, 2009, the entire contents of which are incorporated herein by reference.

FIELD

Embodiment(s) described herein relate to method and apparatus for processing biometric information.

BACKGROUND

In recent years, biometric authentication using biometric information of users is becoming widely used as means for authenticating the users. Examples of available biometric information include capture-image information obtained by capturing images of body parts, such as fingerprints, veins, retina patterns, and voiceprint information obtained by recording voice.

Some biometric authentication apparatuses employing such a method have been proposed.

For example, Japanese Unexamined Patent Application Publication No. 2008-77518 discusses a configuration including means for updating and registering, separately from initially enrolled first reference biometric data, biometric data used each time authentication succeeds, as a second reference biometric data. When the matching rate between the first reference biometric data and the second reference biometric data is lower than or equals to a threshold, a request for re-enrolling the reference biometric data is issued.

In addition, for example, Japanese Unexamined Patent Application Publication No. 2008-79680 discusses a related technology, in which an approximation function expressing aging body parts derived from history of similarity between the enrolled biometric information and sample biometric information for each verifications. When the similarity estimated from the approximation function is lower than or equal to a predetermined threshold, the enrolled biometric information is updated.

SUMMARY

According to an aspect of the invention, a biometric-information processing apparatus and method are described herein. An embodiment of the biometric-information processing apparatus includes, a storage processing unit that stores sample biometric information of a user each time biometric authentication processing for matching sample biometric information of the user with enrolled biometric information registered in a first storage unit succeeds, where the user's sample biometric information is stored in a second storage unit, and an update-candidate selecting unit that selects an update-candidate biometric information for updating the user's enrolled biometric information from the user's sample biometric information stored in the second storage unit, based on a result of comparing each of the user's plural sample biometric information stored in the second storage unit against the enrolled biometric information of other users.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which:

FIG. 7 illustrates one example of a data management table in a temporary-data storage unit;

FIG. 18 is a table illustrating one example of operation-status monitoring information displayed on a management terminal;

DETAILED DESCRIPTION

Figure 1:
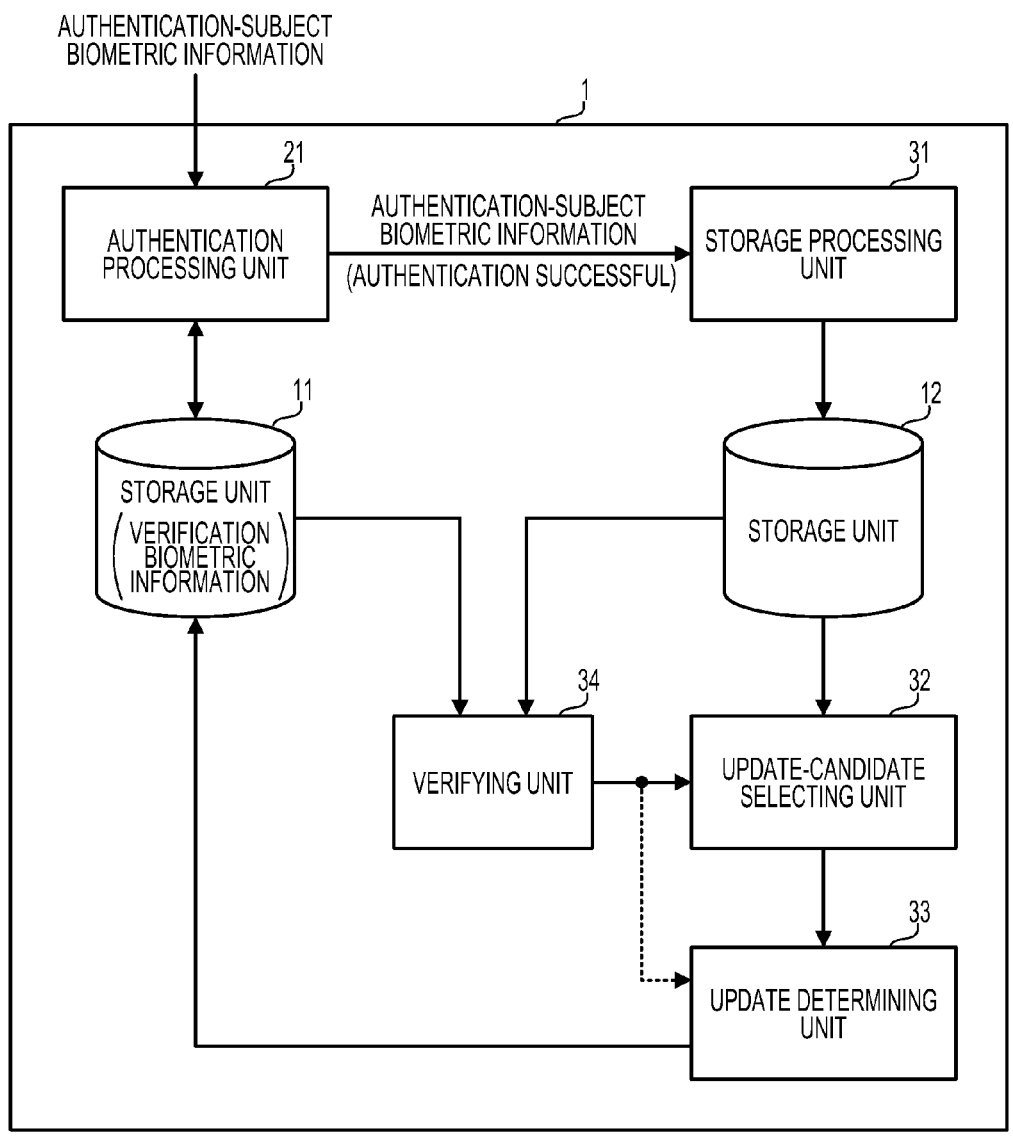
FIG. 1 is a diagram illustrating an example of a configuration of a biometric-information processing apparatus according to an embodiment.

Embodiments will be described below in detail with reference to the accompanying drawings. Reference will be made in detail to the embodiments, examples of which are illustrated in the accompanying drawings, wherein like reference numerals refer to the like elements throughout. The embodiments are described below to explain the present invention by referring to the figures.

FIG. 1 is a diagram illustrating an example of the configuration of a biometric-information processing apparatus according to an embodiment.

A biometric-information processing apparatus 1 illustrated in FIG. 1 is an apparatus for processing biometric information used for biometric authentication processing. Examples of available biometric information include capture-image information obtained by capturing an image of a body portion, such as a fingerprint, veins, or a retina pattern, and voiceprint information obtained by recording voice. The biometric-information processing apparatus 1 includes storage units 11 and 12, an authentication processing unit 21, a storage processing unit 31, an update-candidate selecting unit 32, an update determining unit 33, and a verifying unit 34. The storage units 11 and 12 and the authentication processing unit 21 may be provided outside of the biometric-information processing apparatus 1.

Biometric information for verification for each user is pre-registered in the storage unit 11. This biometric information is herein referred to as "enrolled biometric information." The authentication processing unit 21 receives biometric information captured from a user to be authenticated. This biometric information is herein referred to as "sample biometric information". The authentication processing unit 21 executes biometric authentication by comparing the sample biometric information with enrolled biometric information registered in the storage unit 11.

When the authentication succeeds, the sample biometric information at this time is sent to the storage processing unit 31. That is, the authentication processing unit 21 receives the sample biometric information and executes biometric authentication processing. Each time the authentication succeeds, the authentication processing unit 21 sends the sample biometric information at this time to the storage processing unit 31. The storage processing unit 31 stores, in the storage unit 12, the sample biometric information with which the authentication was successful.

The update-candidate selecting unit 32, the update determining unit 33, and the verifying unit 34 are provided in order to update the enrolled biometric information, registered in the storage unit 11, with identical-user's sample biometric information stored in the storage unit 12. That is, enrolled biometric information is updated with the sample biometric information using which the authentication was successful after the registration of enrolled biometric information, so that appropriate enrolled biometric information according to the biometric information of aging body parts can always be stored. In addition, the update-candidate selecting unit 32 and the update determining unit 33 perform update processing so as to prevent the updated enrolled biometric information from being falsely authenticated with enrolled biometric information of another user.

On the basis of the result of the verification performed by the verifying unit 34, the update-candidate selecting unit 32 selects, from a particular user's sample biometric information stored in the storage unit 12, sample biometric information to be used as an update candidate of enrolled biometric information of the user. In the selection processing, sample biometric information that has lower similarity to the other users' enrolled biometric information is selected as an update candidate.

In this processing, the verifying unit 34 verifies each of multiple pieces of the user's own sample biometric information stored in the storage unit 12 against each of multiple pieces of enrolled biometric information of the other users, and outputs results of the verifications. On the basis of the results of the verifications, it is possible to recognize to what degree each piece of the user's own sample biometric information stored in the storage unit 12 is similar to each piece of the other users' enrolled biometric information already registered in the storage unit 11. That is, it is possible to estimate a false accept rate (FAR) of each piece of the sample biometric information relative to the registered enrolled biometric information.

Thus, on the basis of at least the above-described verification results, the update-candidate selecting unit 32 selects, as the update candidate, biometric information having a lowest possible false accept rate relative to the other users' enrolled biometric information from the user's own sample biometric information registered in the storage unit 12.

The update determining unit 33 determines whether or not the corresponding user's enrolled biometric information is to be updated using the sample biometric information selected by the update-candidate selecting unit 32. In this determination processing, the update is permitted when the false accept rate of the sample biometric information selected as the update candidate is equivalent to or is lower than the false accept rate of the user's own currently registered enrolled biometric information.

In this case, the verifying unit 34 verifies the user's own enrolled biometric information against the other users' enrolled biometric information and outputs results of the verifications. On the basis of the verification results, it is possible to recognize to what degree the user's own enrolled biometric information is similar to the other users' enrolled biometric information. The verification results may have already been obtained before the verification processing, depending on a procedure of the selection processing at the update-candidate selecting unit 32.

The update determining unit 33 compares the thus-obtained verification results with results of verification of the sample biometric information selected as the update candidate against the other users' enrolled biometric information. The latter results of the verification are already obtained through the above-described update-candidate selection processing. By determining whether or not the update is to be permitted on the basis of the verification results, the update determining unit 33 can reliably identify sample biometric information having a false accept rate that is equivalent to or lower than that of the currently registered enrolled biometric information.

As a result of the above-described processing, the sample biometric information that does not cause an increase in the false accept rate is selected, so that enrolled biometric information can be updated with the sample biometric information. Thus, enrolled biometric information can be updated according to aging without an increase in the probability of occurrence of false authentication with other users' enrolled biometric information, and the registered information can be optimized.

Although the above description has been given of a case in which the update-candidate selecting unit 32 and the update determining unit 33 perform the processing based on the false accept rate, they may also perform processing based on a false reject rate (FRR). For example, the arrangement may be such that the verifying unit 34 cross-verifies the multiple pieces of the user's own sample biometric information stored in the storage unit 12. On the basis of the results of the verifications, it is possible to recognize the similarities between the pieces of the registered sample biometric information. Thus, on the basis of the verification results, the update-candidate selecting unit 32 selects, as the update candidate, sample biometric information having a highest possible similarity to the user's own other sample biometric information, in addition to the above-described determination criteria. Such an arrangement can also reduce the false reject rate with respect to the sample biometric information selected as the update candidate.

Next, biometric-information update determination processing will be described in conjunction with a more specific example.

Figure 2:
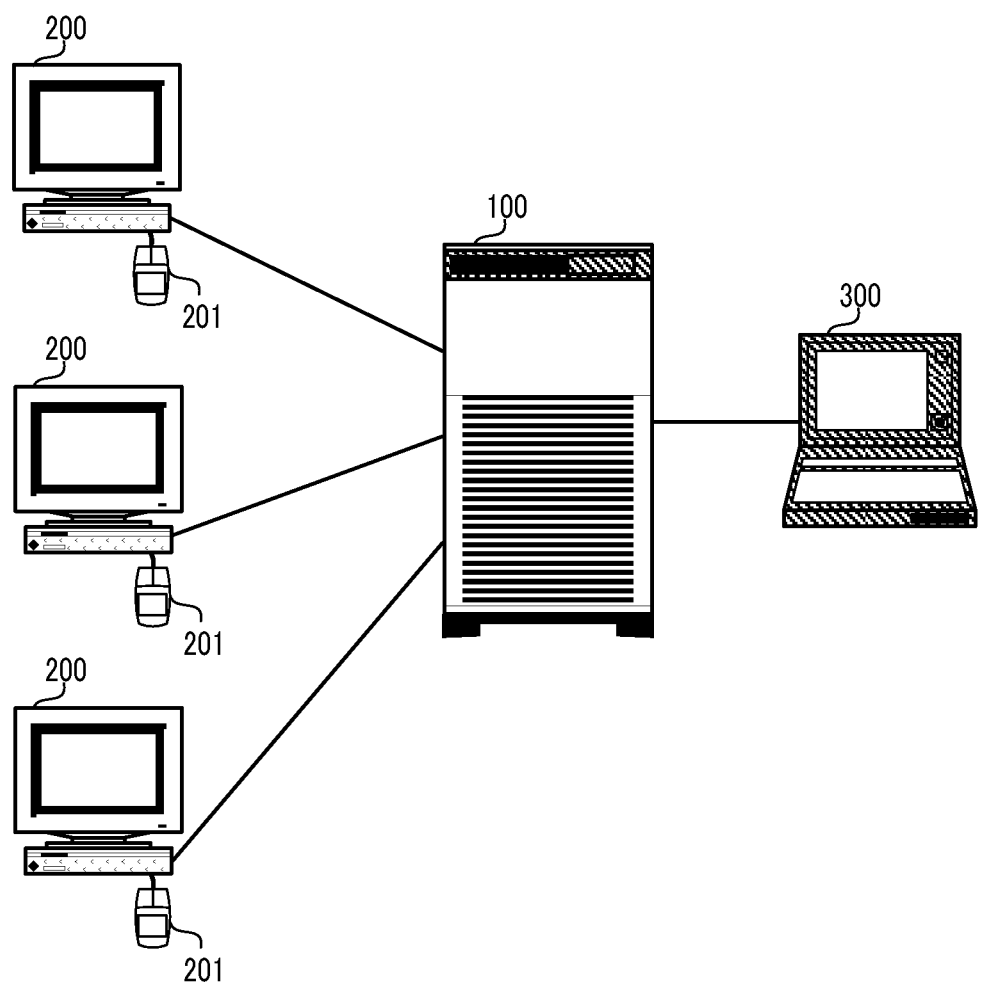
FIG. 2 is a diagram illustrating an example of a system configuration of a biometric authentication system according to an embodiment.

FIG. 2 is a diagram illustrating an example of the system configuration of a biometric authentication system according to an embodiment.

As illustrated in FIG. 2, the biometric authentication system according to the present embodiment includes a biometric authentication server 100, at least one biometric authentication terminal 200, and a management terminal 300. The biometric authentication server 100, the biometric authentication terminal(s) 200, and the management terminal 300 are interconnected through, for example, a network.

The biometric authentication server 100 stores biometric information of pre-enrolled users. The biometric authentication server 100 receives biometric information, captured from the user, including using the biometric authentication terminal 200. The biometric authentication server 100 then performs authentication processing by verifying the received biometric information against the stored biometric information and reports a result of the authentication to the biometric authentication terminal 200. The biometric authentication server 100 further has a function for updating the registered biometric information as needed.

The information extracted from the user's captured biometric sample at the biometric authentication terminal 200 and transmitted to the biometric authentication server 100 is herein referred to as "temporary biometric data". The biometric information pre-registered in the biometric authentication server 100 to be matched with the temporary biometric data is herein referred to as "reference biometric data". Processing for initially enrolling the reference biometric data in the biometric authentication server 100 may be performed, for example, via the biometric authentication terminal 200.

The biometric authentication terminal 200 has an input unit 201 for capturing biometric information from the user. The input unit 201 reads, for example, an image of a body part, such as palm veins, of the user. The input unit 201 may be provided outside of the biometric authentication terminal 200 or may be integrated with the biometric authentication terminal 200. The biometric authentication terminal 200 generates the temporary biometric data on the basis of the biometric information captured by the input unit 201 and transmits the generated temporary biometric data to the biometric authentication server 100.

The management terminal 300 is a terminal operated by a system administrator of the biometric authentication system. With the management terminal 300, the system administrator can perform, for example, various settings or management operations regarding a reference-biometric-data automatic update process at the biometric authentication server 100.

Figure 3:
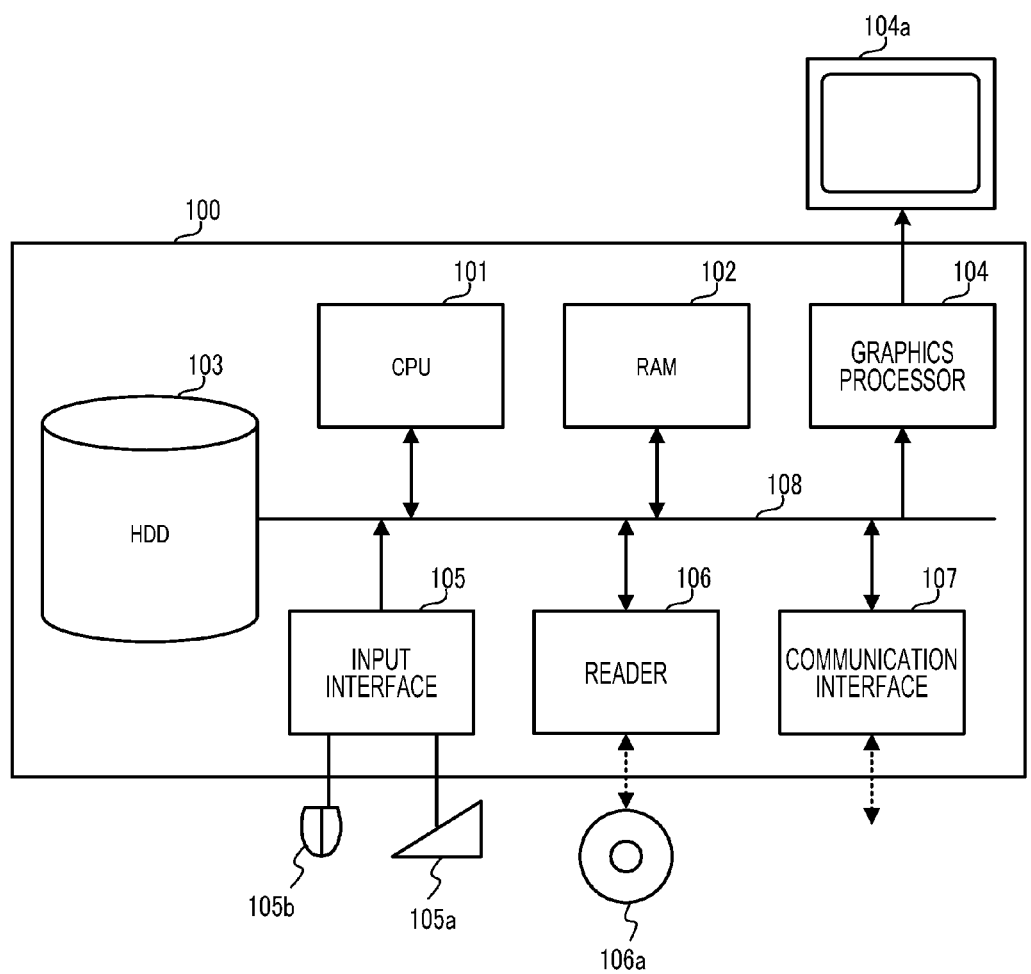
FIG. 3 is a diagram illustrating an example of a hardware configuration of a biometric authentication server.

FIG. 3 is a diagram illustrating an example of the hardware configuration of the biometric authentication server.

The biometric authentication server 100 is implemented by, for example, a computer as illustrated in FIG. 3. This computer includes a CPU (central processing unit) 101, a RAM (random access memory) 102, a HDD (hard disk drive) 103, a graphics processor 104, an input interface 105, a reader 106, and a communication interface 107, which are interconnected through a bus 108.

The CPU 101 comprehensively controls the entire computer by executing various programs stored in the HDD 103. The RAM 102 temporarily stores at least part of the program (s) to be executed by the CPU 101 and various types of data needed for processing for the program(s). The HDD 103 stores the program(s) to be executed by the CPU 101, various types of data needed for execution of the program(s), and so on.

A monitor 104a is coupled to the graphics processor 104. In accordance with an instruction from the CPU 101, the graphics processor 104 displays an image on the screen of the monitor 104a. A keyboard 105a and a mouse 105b are coupled to the input interface 105. The input interface 105 sends signals, input from the keyboard 105a and the mouse 105b, to the CPU 101 through the bus 108.

The reader 106 reads data from a portable recording medium 106a and sends the read data to the CPU 101 through the bus 108. As the portable recording medium 106a, for example, an optical disk may be used. The communication interface 107 is coupled with external apparatuses, such as the biometric authentication terminal 200 and the management terminal 300, via a connector (not illustrated) to transmit/receive data to/from the external apparatuses.

Each of the biometric authentication terminal 200 and the management terminal 300 can also essentially be realized by a hardware configuration that is similar to the configuration illustrated in FIG. 3. In this case, for example, the input unit 201 of the biometric authentication terminal 200 may be coupled to the biometric authentication terminal 200 via the communication interface 107.

Figure 4:
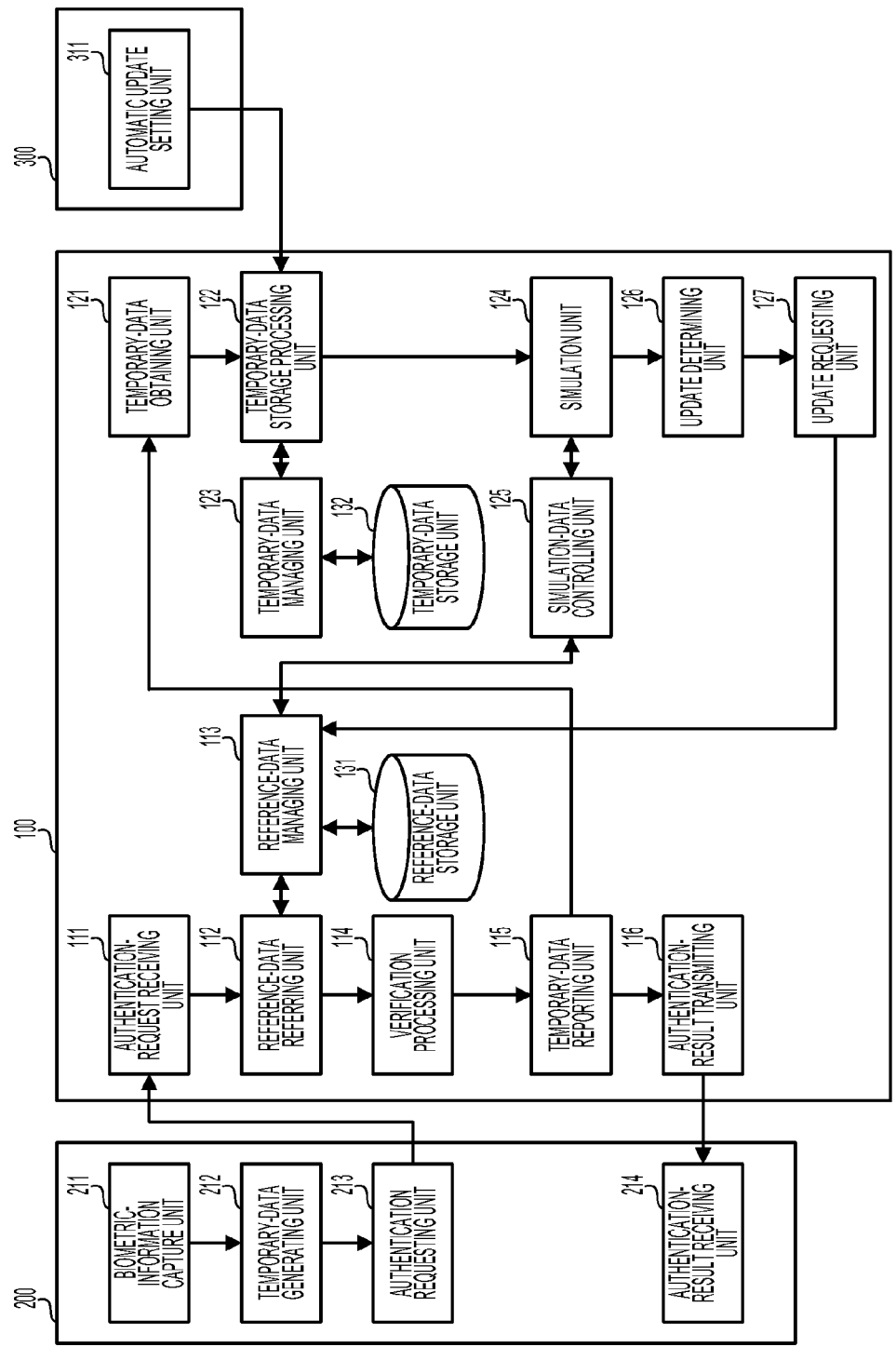
FIG. 4 is a diagram illustrating functions of apparatuses in a biometric authentication system.

FIG. 4 is a diagram illustrating functions of the apparatuses in the biometric authentication system.

The biometric authentication terminal 200 includes a biometric-information capture unit 211, a temporary-data generating unit 212, an authentication requesting unit 213, and an authentication-result receiving unit 214. When the biometric authentication terminal 200 is implemented as a computer as described above, the functions of the biometric authentication terminal 200 are realized by a predetermined program executed by the CPU.

The biometric-information capture unit 211 obtains biometric information, captured from the user, including using the input unit 201.

The temporary-data generating unit 212 performs predetermined processing on the biometric information, obtained by the biometric-information capture unit 211, to thereby generate temporary biometric data as data used for verification against the reference biometric data.

The authentication requesting unit 213 transmits the generated temporary biometric data to the biometric authentication server 100 and issues a request for authentication processing to the biometric authentication server 100.

The authentication-result receiving unit 214 receives data indicating the result of the authentication from the biometric authentication server 100 and reports the authentication result to the user. Examples of a method for reporting the authentication result include a method of displaying the authentication result on the screen as character information and a method of outputting sound/voice corresponding to the authentication result.

The biometric authentication server 100 has two functions in broad terms: a function for executing the authentication processing and a function for updating the reference biometric data. The biometric authentication server 100 has, as the function for executing the authentication processing, an authentication-request receiving unit 111, a reference-data referring unit 112, a reference-data managing unit 113, a verification processing unit 114, a temporary-data reporting unit 115, and an authentication-result transmitting unit 116. In addition, the biometric authentication server 100 has, as the function for updating the reference biometric data, a temporary-data obtaining unit 121, a temporary-data storage processing unit 122, a temporary-data managing unit 123, a simulation unit 124, a simulation-data controlling unit 125, an update determining unit 126, and an update requesting unit 127. The functions included in the biometric authentication server 100 are realized by, for example, the CPU 101 executing a predetermined program stored in the HDD 103.

The biometric authentication server 100 further has a reference-data storage unit 131 and a temporary-data storage unit 132. The storage units 131 and 132 may be realized using, for example, a storage area in the HDD 103. Alternatively, the storage units 131 and 132 may be provided outside of the biometric authentication server 100 and be coupled thereto through a network or the like.

The authentication-request receiving unit 111 receives the authentication-processing request and the temporary biometric data from the authentication requesting unit 213 in the biometric authentication terminal 200.

The reference-data referring unit 112 receives the temporary biometric data from the authentication-request receiving unit 111 and issues a request to the reference-data managing unit 113 so as to read the reference biometric data registered in the reference-data storage unit 131. The reference-data referring unit 112 then reads the requested reference biometric data via the reference-data managing unit 113 and outputs the read reference biometric data, together with the temporary biometric data, to the verification processing unit 114.

In response to a request from the reference-data referring unit 112, the simulation-data controlling unit 125, or the like, the reference-data managing unit 113 executes writing to or reading from the reference-data storage unit 131. Plural users' reference biometric data for verification by a temporary biometric data are registered in the reference-data storage unit 131.

The verification processing unit 114 verifies the temporary biometric data against the reference biometric data to execute authentication processing and outputs the result of the authentication. When the authentication succeeds, the verification processing unit 114 outputs the temporary biometric data used for the verification and a corresponding user ID (identifier).

The temporary-data reporting unit 115 reports, to the temporary-data obtaining unit 121, the temporary biometric data and user ID output from the verification processing unit 114 when the authentication was successful.

The authentication-result transmitting unit 116 receives the authentication result, output from the verification processing unit 114, via the temporary-data reporting unit 115 and transmits the authentication result to the authentication-result receiving unit 214 in the biometric authentication terminal 200.

The temporary-data obtaining unit 121 receives the temporary biometric data and user ID reported from the temporary-data reporting unit 115 and outputs the temporary biometric data and the user ID to the temporary-data storage processing unit 122.

The temporary-data storage processing unit 122 registers the temporary biometric data and user ID, output from the temporary-data obtaining unit 121, into the temporary-data storage unit 132 via the temporary-data managing unit 123. When a predetermined condition is satisfied, for example, when the total number of pieces of temporary biometric data registered in the temporary-data storage unit 132 reaches a certain number, the temporary-data storage processing unit 122 reads the registered temporary biometric data to the simulation unit 124. The temporary-data storage processing unit 122 then causes the simulation unit 124 to start processing for updating the data registered in the reference-data storage unit 131.

In response to a request from another functional block such as the temporary-data storage processing unit 122, the temporary-data managing unit 123 executes writing to or reading from the temporary-data storage unit 132.

The simulation unit 124 receives the temporary biometric data, stored in the temporary-data storage unit 132, from the temporary-data storage processing unit 122. The simulation unit 124 also reads the reference biometric data, registered in the reference-data storage unit 131, via the simulation-data controlling unit 125 and the reference-data managing unit 113. The simulation unit 124 then executes verification simulation using these pieces of data.

In the verification simulation, verification processing is executed using the temporary biometric data stored in the temporary-data storage unit 132 and the reference biometric data registered in the reference-data storage unit 131. In the verification processing, the qualities of the temporary biometric data stored in the temporary-data storage unit 132 are evaluated. In this case, the temporary biometric data with respect to a user associated with one user ID, as the similarities to other users' reference biometric data decrease and the similarities to the user's own the other temporary biometric data increase, the temporary biometric data is evaluated as having a higher quality. The temporary biometric data having the highest quality is selected as data of an update candidate and is reported to the update determining unit 126.

On the basis of the quality of the temporary biometric data determined by the simulation unit 124, the update determining unit 126 determines whether or not the reference biometric data is to be updated with the determined temporary biometric data.

When the update determining unit 126 determines that the reference biometric data is to be updated, the update requesting unit 127 reports the temporary biometric data and the user ID to the reference-data managing unit 113. The update requesting unit 127 then requests the reference-data managing unit 113 to overwrite the reference biometric data, stored in the reference-data storage unit 131 and associated with the corresponding user ID, with the reported temporary biometric data.

The management terminal 300 has an automatic update setting unit 311. In accordance with an input operation performed by the administrator, the automatic update setting unit 311 executes setting processing regarding reference-biometric-data update processing at the biometric authentication server 100. For example, with respect to the temporary-data storage processing unit 122 in the biometric authentication server 100, the automatic update setting unit 311 sets a condition for starting execution of the verification simulation processing. When the management terminal 300 is implemented as a computer as described above, the function of the automatic update setting unit 311 is realized by a predetermined program executed by the CPU.

Next, processing executed by the biometric authentication server 100 will be described in detail.

Figure 5:
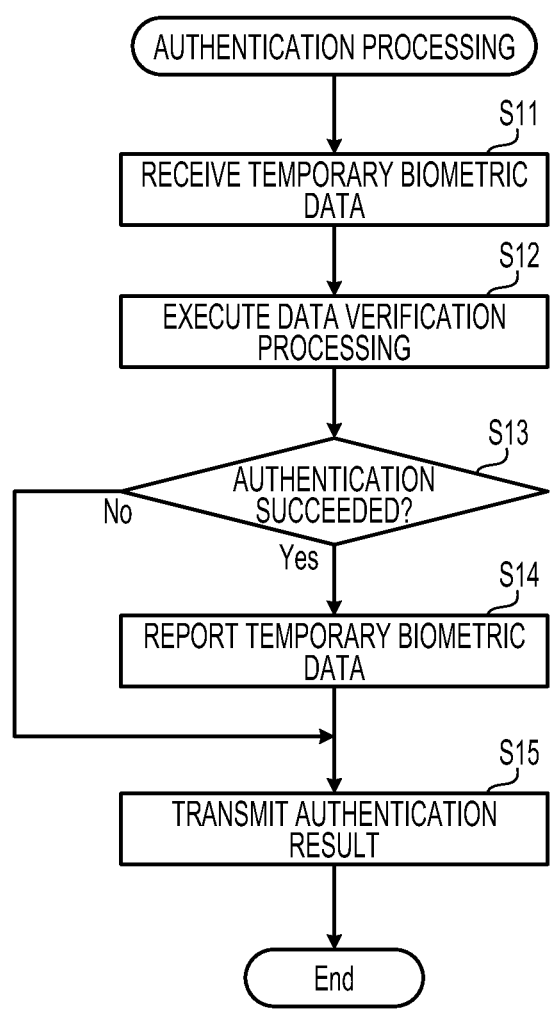
FIG. 5 is a flowchart illustrating a procedure of authentication processing performed by a biometric authentication server.

FIG. 5 is a flowchart illustrating a procedure of authentication processing performed by the biometric authentication server.

When the biometric authentication terminal 200 captures biometric information from the user, the authentication requesting unit 213 transmits temporary biometric data based on the captured biometric information to the biometric authentication server 100. In operation S11 in FIG. 5, the authentication-request receiving unit 111 receives the temporary biometric data, for example, from the biometric authentication terminal 200.

When an authentication method based on one-to-one matching is employed, the user ID of the user from which the biometric information was captured, together with the temporary biometric data, is transmitted from the authentication requesting unit 213 to the authentication-request receiving unit 111.

In operation S12, the temporary biometric data received by the authentication-request receiving unit 111 and the reference biometric data stored in the reference-data storage unit 131 are supplied to the verification processing unit 114. The verification processing unit 114 executes verification processing using the temporary biometric data and the reference biometric data.

In this case, when an authentication method based on one-to-many matching that does not use a user ID is employed, the reference biometric data of all stored in the reference-data storage unit 131 are supplied to the verification processing unit 114 under the control of the reference-data referring unit 112. In this case, the user ID associated with the reference biometric data is also supplied to the verification processing unit 114. On the other hand, when an authentication method based on one-to-one matching is employed, the reference biometric data associated with the user ID received by the authentication-request receiving unit 111 is supplied to the verification processing unit 114 under the control of the reference-data referring unit 112.

In operation S13, on the basis of the result of the verification processing, the verification processing unit 114 outputs an authentication result for the user from which the biometric information was captured. When the authentication is successful, processing in operation S14 is executed, and when the authentication is unsuccessful, processing in operation S15 is executed.

A typical method may be used for the verification and authentication processing performed by the verification processing unit 114.

In operation S14, the temporary-data reporting unit 115, for example, receives the temporary biometric data and the corresponding ID from the verification processing unit 114 and reports the temporary biometric data and the user ID to the temporary-data obtaining unit 121.

In operation S15, the authentication-result transmitting unit 116 receives the result of the authentication performed by the verification processing unit 114 and transmits the authentication result to the authentication-result receiving unit 214 in the biometric authentication terminal 200.

Figure 6:
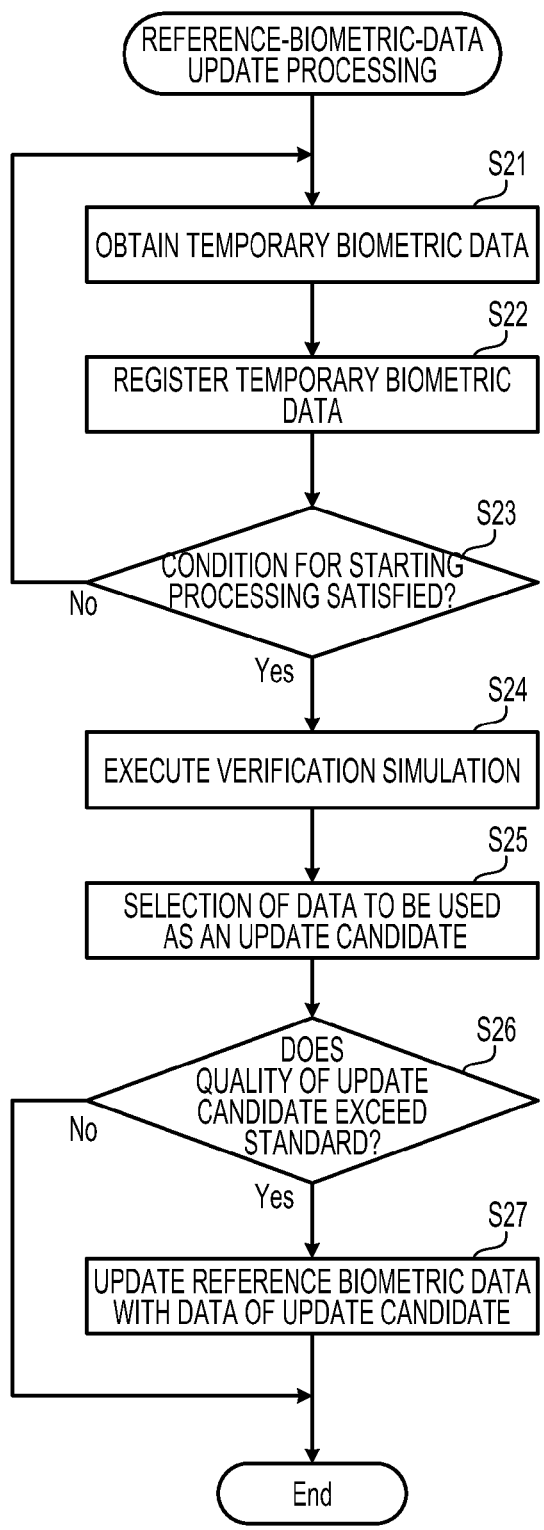
FIG. 6 is a flowchart illustrating a procedure of reference-biometric-data update processing performed by a biometric authentication server.

FIG. 6 is a flowchart illustrating a procedure of reference-biometric-data update processing performed by the biometric authentication server.

In operation S21, the temporary-data obtaining unit 121 obtains the temporary biometric data and user ID reported from the temporary-data reporting unit 115.

In operation S22, the temporary-data storage processing unit 122 registers the temporary biometric data and user ID, obtained from the temporary-data obtaining unit 121, into the temporary-data storage unit 132 via the temporary-data managing unit 123.

In operation S23, the temporary-data storage processing unit 122 determines whether or not a condition for starting verification simulation processing in operation S24 and update determination processing subsequent thereto is satisfied. When the condition is satisfied, processing in operation S24 is executed. On the other hand, when the condition is not satisfied, the temporary-data obtaining unit 121 enters a state in which it waits for the temporary biometric data reported from the temporary-data reporting unit 115. Thereafter, when the temporary-data obtaining unit 121 receives the temporary biometric data and the user ID from the temporary-data reporting unit 115, processing in operation S21 is executed again.

The processing start condition used in operation S23 may be, for example, a condition that the number of pieces of temporary biometric data registered in the temporary-data storage unit 132 reaches a certain number. Alternatively, the processing start condition may be a condition that the number of pieces of temporary biometric data registered in the temporary-data storage unit 132 and associated with a particular user ID reaches a predetermined number. In this case, the processing after operation S23 may be executed with respect to a user ID for which the number of pieces of temporary biometric data has reached a predetermined value, not all user IDs registered in the temporary-data storage unit 132.

Time information, instead of a number of pieces of the registered temporary biometric data, may also be used as the processing start condition. For example, the processing after operation S23 may be executed at predetermined time intervals.

Alternatively, the automatic update setting unit 311 in the management terminal 300 can arbitrarily set the processing start condition used in operation S23, in accordance with an operation input that the administrator performs on the management terminal 300. Such an arrangement allows the administrator to change the frequency of executing the update processing and to adjust quality-evaluation accuracy variations due to a change in the processing start condition.

In operation S24, the simulation unit 124 executes verification simulation using the temporary biometric data registered in the temporary-data storage unit 132 and the reference biometric data registered in the reference-data storage unit 131. In the verification simulation, the qualities of the temporary biometric data are evaluated. In the present embodiment, the false accept rates (FARs) and the false reject rates (FRRs) with respect to the registered temporary biometric data are calculated, and on the basis of the values of the calculated rates, the qualities of the temporary biometric data are evaluated. The verification simulation is described below in detail.

In operation S25, on the basis of the result of the verification simulation, the simulation unit 124 selects data to be used as an update candidate for the reference-data storage unit 131 from the temporary biometric data registered in the temporary-data storage unit 132.

In operation S26, the update determining unit 126 evaluates the quality of the temporary biometric data selected as the update candidate in operation S25 and determines whether or not the evaluated quality exceeds a predetermined criterion value. In the present embodiment, the simulation unit 124 further determines information used for the quality evaluation, and the update determining unit 126 compares the information with the result of the above-described verification simulation to thereby evaluate the quality of the temporary biometric data. The evaluation and determination processing is described below in detail.

When the quality of the temporary biometric data exceeds the criterion, a determination signal is output to the update determining unit 126 and processing in operation S27 is executed. On the other hand, when the quality is lower than or equal to the criterion, the processing is temporarily terminated. In this case, the temporary-data obtaining unit 121 enters a state in which it waits for the temporary biometric data reported from the temporary-data reporting unit 115. Thereafter, when the temporary-data obtaining unit 121 receives the temporary biometric data and the user ID from the temporary-data reporting unit 115, processing in operation S21 is executed again.

In operation S27, the update requesting unit 127 outputs, to the reference-data managing unit 113, the temporary biometric data selected as the update candidate and the user ID corresponding to the temporary biometric data. The update requesting unit 127 also outputs, to the reference-data managing unit 113, an update request signal for requesting updating the reference biometric data. Consequently, the reference-data managing unit 113 updates the reference biometric data, stored in the reference-data storage unit 131 and associated with the user ID, with the temporary biometric data.

According to the above-described processing, each time the authentication succeeds in the authentication processing illustrated in FIG. 5, the authenticated temporary biometric data is registered in the temporary-data storage unit 132. Thereafter, when it is determined in operation S23 that the predetermined processing start condition is satisfied, processing for updating the reference biometric data is executed.

FIG. 7 illustrates an example of a data management table in the temporary-data storage unit.

As described above, the temporary biometric data with which the authentication was successful and the user IDs corresponding to the temporary biometric data are sequentially registered in the temporary-data storage unit 132. The data registered in the temporary-data storage unit 132 are managed, for example, in the form of a data management table 132a illustrated in FIG. 7. In the data management table 132a, management IDs are given to respective pieces of the registered temporary biometric data.

In the example of FIG. 7, timestamps are further given to the respective pieces of the temporary biometric data. Each timestamp indicates time at which authentication processing is executed using the corresponding temporary biometric data. The time is clocked by, for example, the temporary-data obtaining unit 121 and is given to the corresponding temporary biometric data.

The timestamp can also be used in the determination processing in operation S23. For example, when temporary biometric data associated with a user ID of the already registered temporary biometric data was registered in operation S22, the timestamp of the temporary biometric data registered earliest may be referred to. Further, when the difference between the time of the timestamp referred to and the time of the timestamp of the most-recent temporary biometric data exceeds a certain time, processing in operation S24 may be executed.

Referring to the timestamps allows temporary biometric data registered in a particular period of time to be picked from the temporary biometric data registered in the data management table 132a. For example, when the number of pieces of the registered temporary biometric data reaches a predetermined number, the temporary biometric data registered in a predetermined period of time before that point of time can be picked and can be used for the verification simulation and the update determination. With this arrangement, for example, even when the number of pieces of the registered temporary biometric data is used as the processing start condition, temporary biometric data that seems to have changed too much due to aging body parts can be excluded from the temporary biometric data to be updated.

Figure 8:
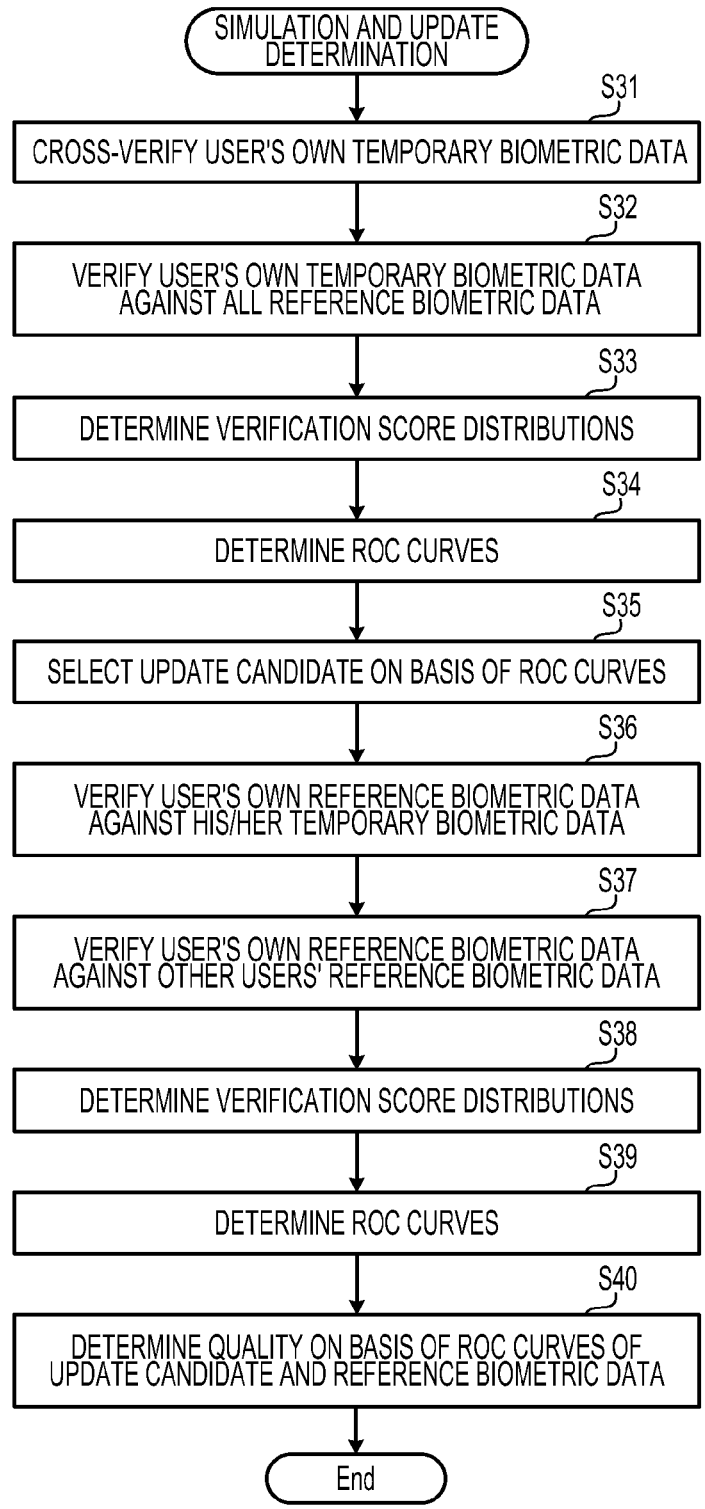
FIG. 8 is a flowchart illustrating a procedure of verification simulation and update-determination processing.

FIG. 8 is a flowchart illustrating a procedure of the verification simulation and the update determination processing. The processing in FIG. 8 corresponds to the processing in operations S24 to S26 illustrated in FIG. 6. FIG. 8 also illustrates a procedure of the update determination processing for reference biometric data associated with one of the user IDs stored in the temporary-data storage unit 132.

In operation S31, the simulation unit 124 selects, as a user to be subjected to the update processing, a user associated with one of the user IDs registered in the temporary-data storage unit 132. The simulation unit 124 then obtains the user's own temporary biometric data from the temporary-data storage unit 132 and cross-verifies the temporary biometric data to calculate verification scores based on all combinations of the temporary biometric data.

Each verification score is essentially a numeric value indicating the similarity between two pieces of the temporary biometric data. A typical method used for the authentication processing may be used as a method for computing the verification scores. In the present embodiment, a computation method that is the same as the method used in the verification processing unit 114 may be used.

In operation S32, the simulation unit 124 verifies one of the pieces of the user's own temporary biometric data registered in the temporary-data storage unit 132 against each of all pieces of the reference biometric data stored in the reference-data storage unit 131. The verification scores are then calculated based on all combinations of the temporary biometric data and the reference biometric data.

The simulation unit 124 further performs the above-described computation on all pieces of the user's own temporary biometric data registered in the temporary-data storage unit 132. In this case, the number of pieces of the user's own temporary biometric data registered in the temporary-data storage unit 132 is represented by P and the number of pieces of the reference biometric data registered in the reference-data storage unit 131 is represented by Q. Thus, in operation S32, P verification score groups, each including Q verification scores determined from one piece of the temporary biometric data, are calculated.

In operation S33, the simulation unit 124 uses the verification scores, calculated in operations S31 and S32, to determine verification score distributions, which indicate frequency distributions of the verification scores. As described below, one verification score distribution includes a frequency distribution of the verification scores calculated in operation S31 and a frequency distribution of one of the verification scores determined in operation S32. Thus, in operation S33, P verification score distributions, P being equal to the number of pieces of the temporary biometric data, are obtained.

In operation S34, the simulation unit 124 calculates FARs and FRRs from each of the verification score distributions obtained in operation S33. The simulation unit 124 then plots, on coordinate plane, the FARs and FRRs which can be calculated from each verification score distribution, and determines receiver operating characteristic (ROC) curves that couples the FARs and FRRs with approximate curves. Consequently, in operation S34, P ROC curves are obtained.

The processing in operations S31 to S34 described above corresponds to the processing in operation S24 illustrated in FIG. 6.

In operation S35, the simulation unit 124 determines that the temporary biometric data corresponding to, of the ROC curves obtained in operation S34, the ROC curve that is closest to the origin of the coordinate is data having the highest quality. The simulation unit 124 then selects the corresponding temporary biometric data as data of an update candidate and outputs the selected temporary biometric data, the corresponding user ID, and the ROC curve to the update determining unit 126. The processing in operation S35 corresponds to the processing in operation S25 illustrated in FIG. 6.

Figure 9:
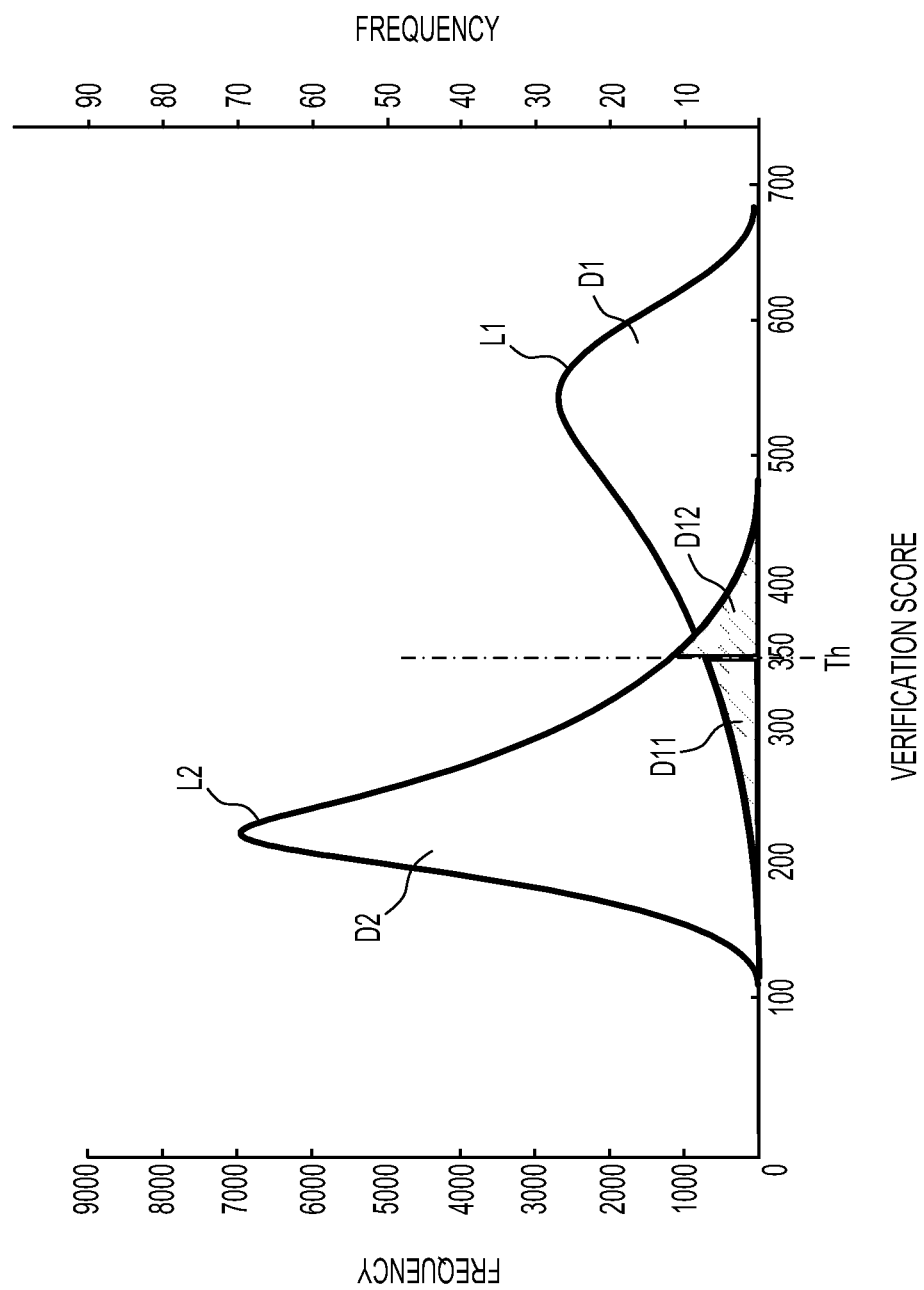
FIG. 9 is a graph depicting one example of a verification score distribution.

The processing in operations S31 to S35 described above will now be described in more detail. FIG. 9 is a graph depicting one example of the verification score distributions.

As described above, the verification score distribution indicates a frequency distribution of the verification scores. In the present embodiment, as indicated by curves L1 and L2 in FIG. 9, the verification score distribution is expressed by approximate curves obtained by performing function approximation on the basis of the frequency distributions. For example, a least-square method, Hermite approximation, or spline approximation can be used as the method for the function approximation. The vertical axis at the right-hand side in FIG. 9 corresponds to the curve L1 and the vertical axis at the left-hand side corresponds to the curve L2.

In operation S31 in FIG. 8, the user's own temporary biometric data registered in the temporary-data storage unit 132 are verified against each other. Since all pieces of the temporary biometric data have been successfully authenticated, the similarities between each other are relatively high. Thus, many of the verification scores calculated in the verification processing in operation S32 are distributed in a relatively high verification-score region, as indicated by the curve L1 in FIG. 9.

In contrast, in operation S32 in FIG. 8, the user's own temporary biometric data are compared with the reference biometric data, most of which are data of other users. Consequently, the similarities between the user's own biometric information and the other users' biometric information are relatively low. Thus, many of the verification scores calculated in operation S32 are distributed in a relatively low verification-score region, as indicated by the curve L2 in FIG. 9.

Thus, in operation S33 in FIG. 8, a verification score distribution including an approximate curve having its peak at a higher-verification-score side, as indicated by the curve L1 in FIG. 9, and an approximate curve having its peak at a lower-verification-score side, as indicated by the curve L2, is obtained. In operation S33 in FIG. 8, such verification score distributions are obtained according to the number of pieces of the temporary biometric data. In these verification score distributions, approximate curves having their peaks at higher verification-score sides are common to each other.

Next, in operation S34 in FIG. 8, FARs and FRRs are calculated from the verification score distributions and ROC curves are determined based on the values of the FARs and FRRs. With respect to the verification scores illustrated in FIG. 9, an arbitrary verification score is set as a virtual threshold Th for determining whether or not the temporary biometric data is the user's own biometric data during the authentication processing. That is, in a case in which the temporary biometric data is verified against the reference biometric data to perform authentication processing, when the verification score between the temporary biometric data and the reference biometric data is greater than or equal to the threshold Th, it is determined that the authentication is successful. Conversely, when the verification score between the temporary biometric data and the reference biometric data is lower than the threshold Th, it is determined that the authentication is unsuccessful.

In such a case, in the verification scores illustrated in FIG. 9, the area of a region defined by the curve L1 and the horizontal axis is indicated by D1 and the area of a region defined by the curve L2 and the horizontal axis is indicated by D2. In the area of the region defined by the curve L1 and the horizontal axis, the area of a region in which the verification score is smaller than the threshold Th is indicated by D11 and, in the area of the region defined by the curve L2 and the horizontal axis, the area of a region in which the verification score is greater than or equal to the threshold Th is indicated by D12. In this case, the FAR is calculated as D12/D2 and the FRR is calculated as D11/D1. Each of the areas D11 and D12 can be calculated by performing integration on the corresponding approximate curve and adding up the resulting integrals.

Figure 10:
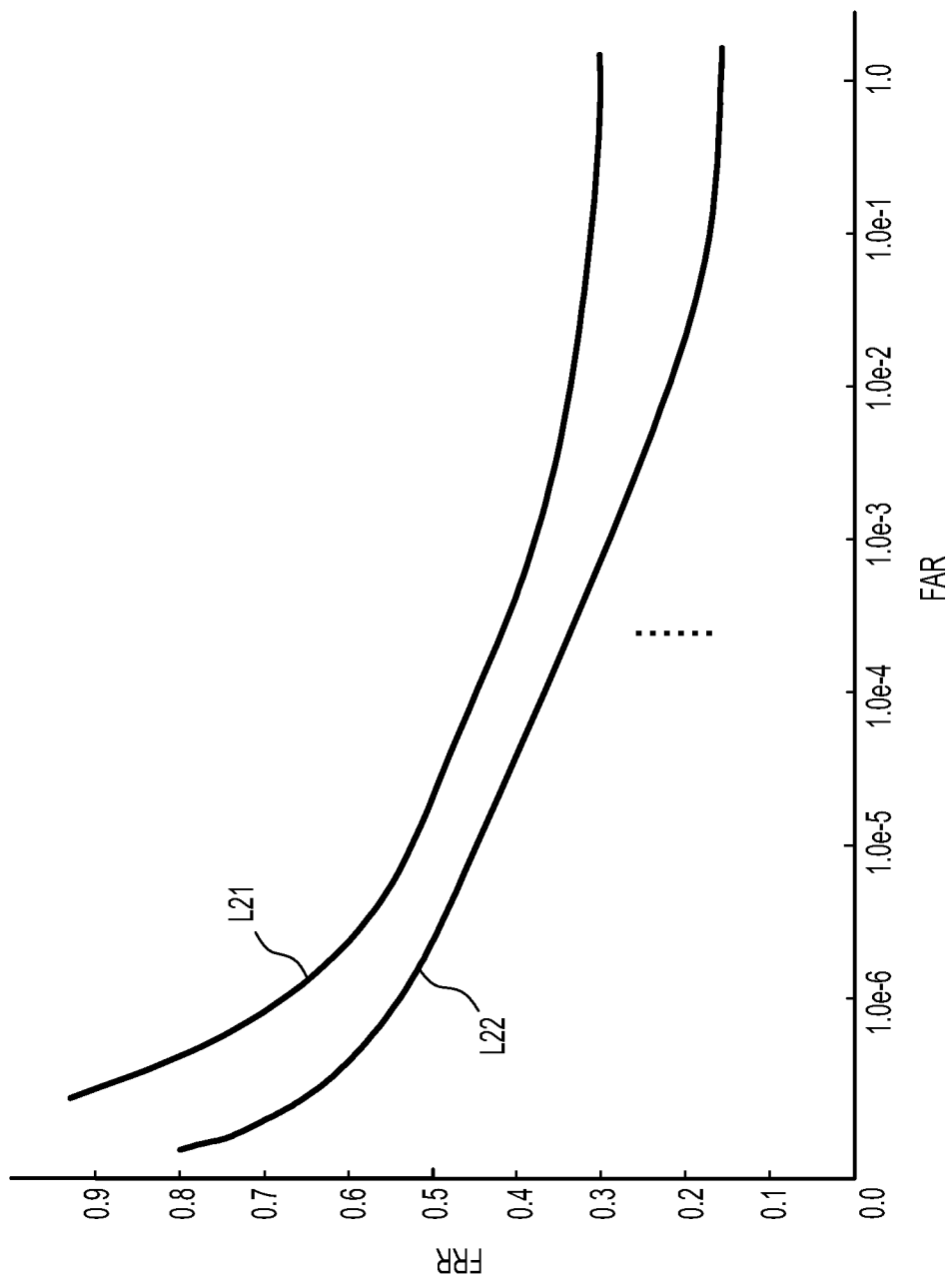
FIG. 10 is a graph depicting an example of receiver operating characteristic (ROC) curves.

FIG. 10 is a graph depicting an example of ROC curves.

The ROC curves can be determined by, in one verification score distribution, determining an FAR and an FRR each time the threshold Th for the verification scores is varied, plotting the determined FARs and the FRRs on coordinate plane, and performing function approximation based on the plotted points.

For example, a least-square method, Hermite approximation, or spline approximation can be used as the method for the function approximation. The resolution for setting the threshold Th may be arbitrary set in response to a request from the automatic update setting unit 311 in the management terminal 300. As the resolution for the threshold Th is increased, the FARs and the FRRs can be more accurately calculated and thus the accuracy of the quality evaluation improves. However, the processing load increases. Thus, the balance between the accuracy of the quality evaluation and the processing load may be determined by the administrator.

In operation S34 in FIG. 8, ROC curves are determined from the respective verification score distributions obtained in operation S33. That is, plural ROC curves are obtained like curves L21 and L22 in FIG. 10. In operation S35 in FIG. 8, temporary biometric data having the highest quality is determined from the multiple ROC curves.

The quality of the temporary biometric data is evaluated as being higher as the similarities to the other users' reference biometric data decrease and the similarities to the user's own temporary biometric data increase, i.e., as both the FAR and FRR decrease. Thus, the ROC curve being located closer to the coordinate origin means that both the FAR and the FRR are low, and the temporary biometric data corresponding to such a ROC curve can be evaluated as having a high quality.

When the ROC curves do not intersect each other as illustrated in the example of FIG. 10, the ROC curve that is closest to the coordinate origin can be easily selected. However, when the ROC curves intersect each other, the ROC curve corresponding to the temporary biometric data having the highest quality is selected by a method described below.

Figure 11:
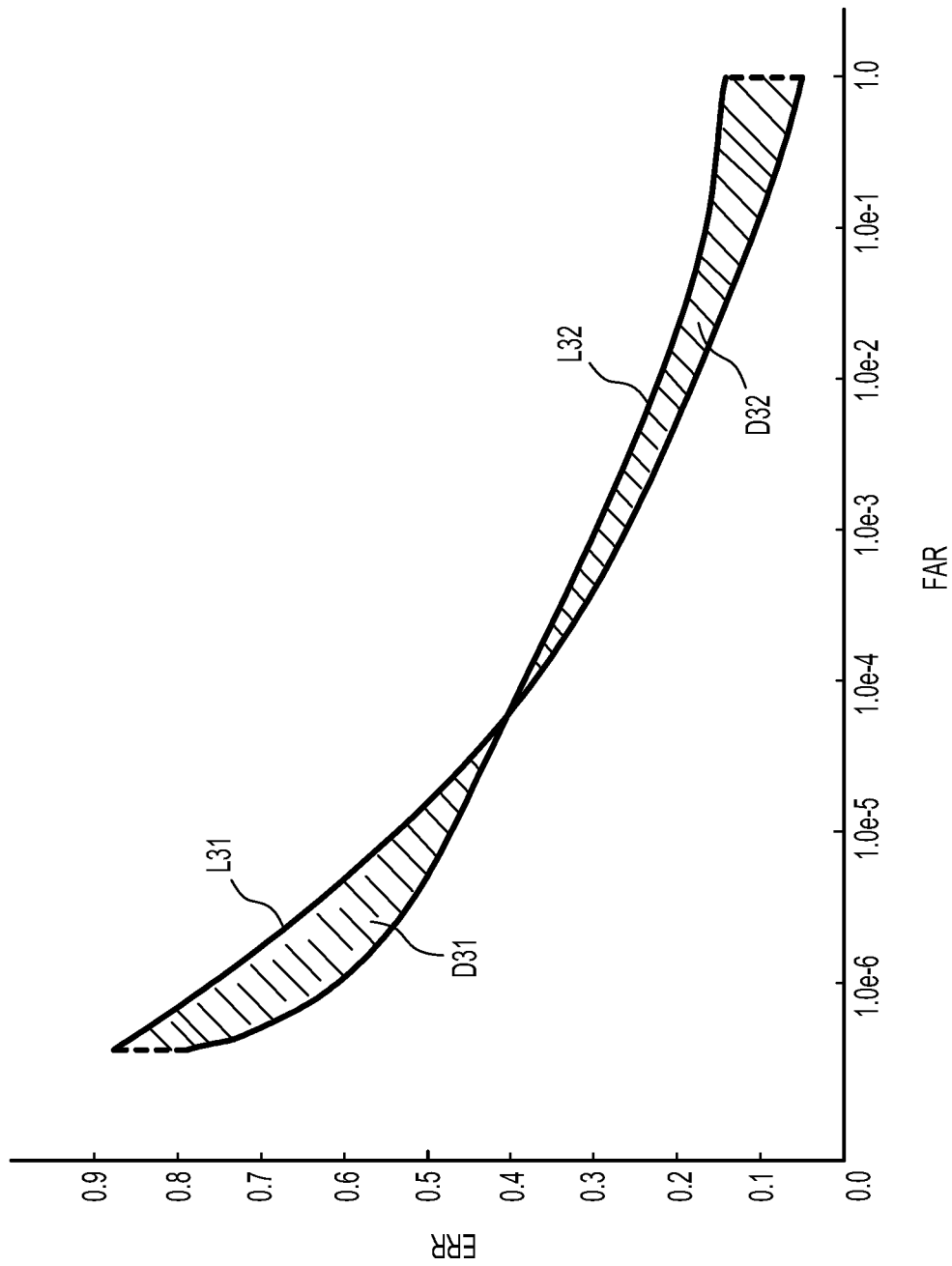
FIG. 11 is a graph depicting an example of ROC curves that intersect each other.

FIG. 11 is a graph depicting an example of ROC curves that intersect each other.

In FIG. 11, ROC curves L31 and L32 intersect each other at one point. In such a case, the simulation unit 124 first calculates, of the regions defined by the curves L31 and L32, an area D31 of a region in which the FAR is lower than the intersection point and an area D32 of a region in which the FAR is higher than or equal to the intersection point.

When the difference between the area D31 and the area D32 is larger than a predetermined threshold and is regarded to be relatively large, the ROC curve that is closer to the origin is selected in the region having the larger area. The temporary biometric data corresponding to the selected ROC curve is selected as high-quality data.

On the other hand, when the difference between the area D31 and the area D32 is smaller than or equal to the threshold, the ROC curve having a lower FRR is selected in a region in which the FAR is lower than the intersection point of the ROC curves. The temporary biometric data corresponding to the selected ROC curve is selected as high-quality data. With this arrangement, quality evaluation is performed with priority being given to a lower FAR over an FRR.

In the above-described ROC curve selection processing, the threshold to be compared with the difference between the areas may be set to zero.

Even when the ROC curves have two or more intersection points, the ROC curve can be selected by a determination scheme that is essentially the same as that described above. A procedure of the selection processing when at least one intersection point is present can be generalized in the following manner. First, the regions defined by two ROC curves are divided by the intersection point(s) and the areas of the divided regions are calculated. Next, the divided region having the largest area is selected. When the selected divided region is located at the leftmost side, i.e., at a lowest-FAR side, the ROC curve having the lower FRR in the divided region is selected. On the other hand, when the selected divided region is not present at the leftmost side, the selected divided region and the adjacent divided region to the left of that divided region are compared with each. Based on the difference between the areas of the divided regions, a determination is made in the same manner as that in the above-described example in FIG. 11. With this arrangement, quality evaluation is performed with priority being given to a lower FAR over an FRR.

In the processing in operations S31 to S35 described above, data having not only a low FRR but also a low FAR is selected, as highest-quality data, from the temporary biometric data registered in the temporary-data storage unit 132. The selected temporary biometric data is then used as an update candidate of the reference biometric data.

When the temporary biometric data to be used as an update candidate is selected in operation S35, processing as follows may be further performed. The simulation unit 124 compares the FAR of the temporary biometric data selected as the update candidate with a predetermined upper-limit threshold. When the FAR is lower than or equal to the upper-limit threshold, the simulation unit 124 outputs the selected temporary biometric data, the corresponding user ID, and the ROC curve to the update determining unit 126. Conversely, when the FAR exceeds the upper-limit threshold, processing in operation S36 and the subsequent processing are not executed and the reference biometric data is not updated.

Through processing as described above, it is possible to reliably enhance the quality of the updated reference biometric data and it is also possible to more reliably prevent false authentication. The upper-limit threshold may be arbitrarily settable by, for example, processing in the automatic update setting unit 311 in the management terminal 300. Such an arrangement allows the administrator to explicitly set the quality of the updated reference biometric data.

A description will be given below with reference back to FIG. 8. Processing in operations S36 to S40 described below corresponds to the processing in operation S26 in FIG. 6.

In operation S36, the simulation unit 124 reads the user's own reference biometric data from the reference-data storage unit 131 and reads all pieces of his/her temporary biometric data from the temporary-data storage unit 132. The simulation unit 124 then verifies the user's own reference biometric data against all pieces of his/her temporary biometric data to calculate verification scores based on all of the combinations of the reference biometric data and the temporary biometric data.

In operation S37, the simulation unit 124 verifies the user's own reference biometric data of the reference biometric data registered in the reference-data storage unit 131 against other users' reference biometric data therein. The verification scores are then calculated based on all combinations of the reference biometric data.

In operation S38, the simulation unit 124 uses the verification scores, calculated in operations S36 and S37, to determine verification score distributions. In the verification score distributions, approximate curves based on the verification scores calculated in operation S36 have their peaks in regions in which the verification scores are relatively high. Approximate curves based on the verification scores calculated in operation S37 have their peaks in regions in which the verification scores are relatively low.

In operation S39, the simulation unit 124 calculates FARs and FRRs on the basis of the verification score distributions obtained in operation S38 and plots the calculated FARs and the FRRs on the coordinate axes to determine ROC curves. The thus-obtained ROC curves are output to the update determining unit 126 and are used for evaluating the quality of the temporary biometric data selected as the update candidate.

As in operation S34, the resolution for setting the threshold Th used in operation S39 may also be arbitrary settable in response to a request from the automatic update setting unit 311 in the management terminal 300.

In operation S40, the update determining unit 126 compares the ROC curve corresponding to the temporary biometric data selected as the update candidate in operation S35 with the ROC curves obtained in operation S39. As a result of the comparison, the reference biometric data and the temporary biometric data corresponding to the ROC curves are evaluated.

Upon determining that the temporary biometric data selected as the update candidate has a higher quality, the update determining unit 126 permits the reference biometric data to be updated with the temporary biometric data selected as the update candidate. In this case, an update request signal, together with the temporary biometric data selected as the update candidate and the corresponding user ID, is also output from the update requesting unit 127 to the reference-data managing unit 113. Conversely, when it is determined that the reference biometric data has a higher quality, the update request signal is not output and thus the reference biometric data is not updated.

The quality evaluation in operation S40 may be performed by an evaluation method that is analogous to that in operation S35. That is, when the ROC curve corresponding to the temporary biometric data selected as the update candidate is closer to the origin of the coordinate than the ROC curves obtained in operation S39, the former ROC curve has a lower FAR and a lower FRR and is thus evaluated as being higher-quality data. In this case, the reference biometric data is updated. A selection method when the ROC curves intersect each other is also analogous to the selection method used in operation S35.

In the processing in FIG. 8, when temporary biometric data having a higher quality than the registered reference biometric data exists, the reference biometric data is updated with the temporary biometric data. In particular, the update processing is executed using temporary biometric data having at least a lower FAR than the reference biometric data. This arrangement, therefore, allows the reference biometric data to be automatically updated according to the user's biometric information of aging body parts and also allows for a further reduction in the probability of false authentication with another user's reference biometric data.

Such advantages can be obtained not only when an authentication method based on one-to-many matching that does not use the user ID is employed but also when an authentication method based on one-to-one matching using the user ID is employed. For example, when an authentication method based on one-to-one matching is employed, a user who attempts to get authenticated by using a falsified user ID can be excluded.

A biometric authentication system according to an embodiment has a system configuration that is similar to the system configuration in the above-described embodiment and also includes apparatuses having hardware configurations that are similar. In addition, a biometric authentication server in the present embodiment essentially has the same function as that of the biometric authentication server 100 illustrated in FIG. 4. However, the simulation unit 124 and the update determining unit 126 execute verification simulation processing and update determination processing, respectively, as described next with reference to FIG. 12.

Figure 12:
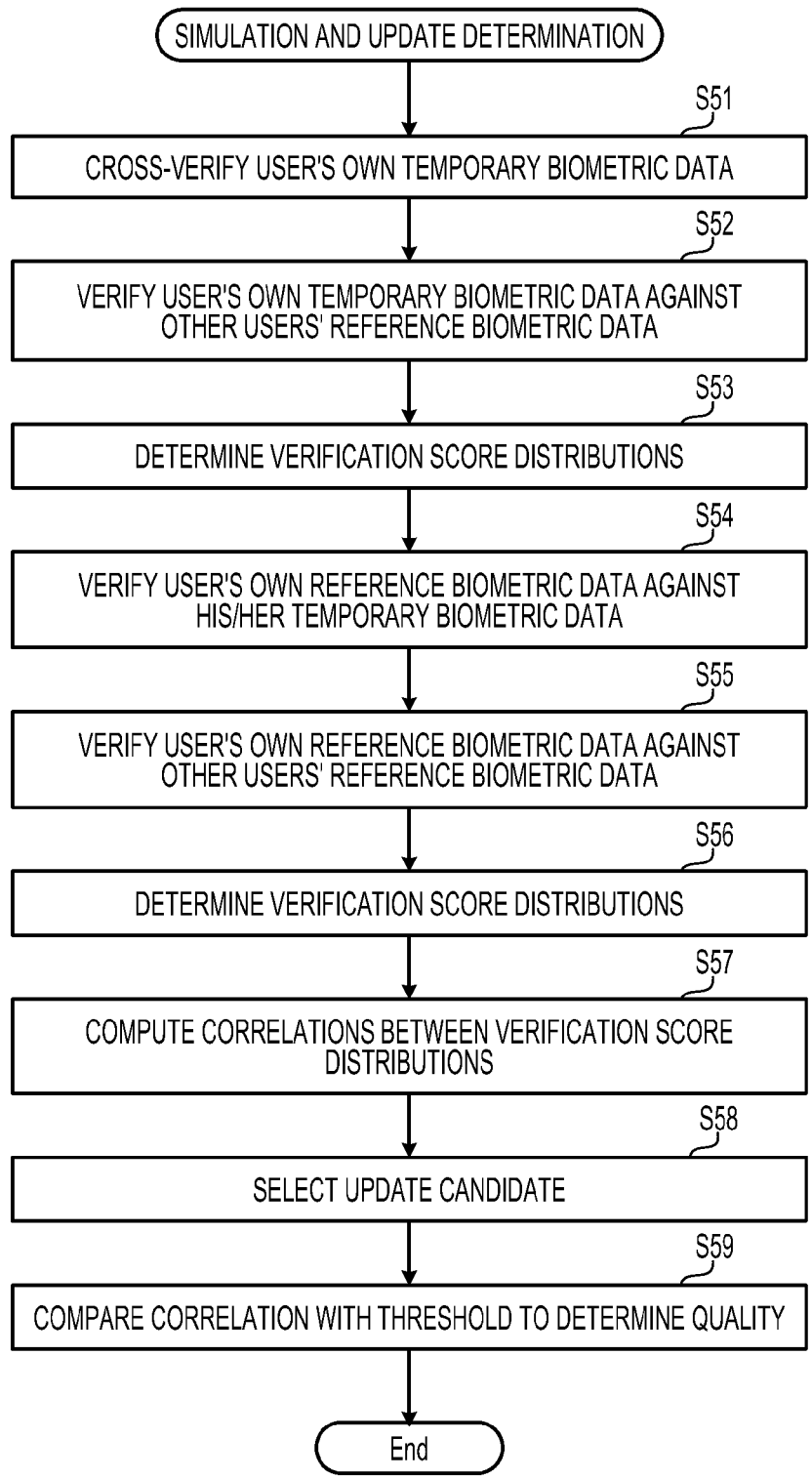
FIG. 12 is a flowchart of a procedure of verification-simulation and update-determination processing performed by a biometric authentication server according to an embodiment.

FIG. 12 is a flowchart illustrating a procedure of the verification-simulation and update-determination processing performed by the biometric authentication server according to an embodiment. The processing in FIG. 12 corresponds to the processing in operations S24 to S26 illustrated in FIG. 6, as in the case of FIG. 8.

Processing in operations S51 to S53 is the same as the processing in operations S31 to S33 in FIG. 8. That is, the simulation unit 124 cross-verifies, of the temporary biometric data registered in the temporary-data storage unit 132, temporary biometric data associated with one user ID to calculate verification scores. Next, the simulation unit 124 verifies each of all pieces of the user's own temporary biometric data against each of all pieces of the reference biometric data to calculate verification scores. Next, using the calculated verification scores, the simulation unit 124 determines verification score distributions according to the number of pieces of the temporary biometric data.

Processing in operations S54 to S56 is the same as the processing in operations S36 to S38 in FIG. 8. That is, the simulation unit 124 verifies the user's own reference biometric data against all pieces of his/her temporary biometric data to calculate verification scores. Next, the simulation unit 124 verifies the user's own reference biometric data against all pieces of the other users' reference biometric data to calculate verification scores. Next, using the calculated verification scores, the simulation unit 124 determines verification score distributions.

In operation S57, the simulation unit 124 computes correlations between the verification score distributions obtained in operation S53 and the verification score distributions obtained in operation S56. As a result of the computation processing, correlations with respect to the respective verification score distributions obtained in operation S53 are calculated.

As illustrated in FIG. 9, comparison score distributions includes approximate curves having their peaks at higher verification-score sides and approximate curves having their peaks at lower verification-score sides. Thus, the correlations computed in this case are correlations between the former approximate curves and correlations between the latter approximate curves.

In operation S58, the simulation unit 124 selects a highest one of the correlations calculated in operation S57. The simulation unit 124 then outputs, as data of the update candidate, the temporary biometric data corresponding to the selected correlation to the update determining unit 126. The simulation unit 124 also outputs the corresponding user ID and the correlation, together with the temporary biometric data, to the update determining unit 126.

As described above, in the verification score distributions obtained in operation S53, all of the approximate curves having their peaks at the higher verification score sides are common to each other. Thus, in operation S58, the correlations based on the approximate curves having their peaks at the lower verification-score sides in operation S57 may be compared with each other. As a result of such processing, the temporary biometric data having an FAR that is equivalent to the previously registered reference biometric data is selected as the update candidate.

In operation S58, when the FAR of the temporary biometric data selected as the update candidate is lower than or equal to the predetermined upper-limit threshold, the selected temporary biometric data, the corresponding user ID, and the correlation may be output to the update determining unit 126. The FAR may be computed from the verification score distribution determined in operation S53 on the basis of the verification scores calculated in operation S52 using that temporary biometric data.

In operation S59, the update determining unit 126 compares the correlation corresponding to the temporary biometric data selected in operation S58 with the predetermined threshold value to thereby determine the quality of the temporary biometric data.

In the determination processing, the update determining unit 126 compares, for example, the correlations of two approximate curves included in the verification score distribution with respective corresponding thresholds. When both of the correlations are greater than or equal to the corresponding thresholds, it is determined that the quality of the temporary biometric data selected as the update candidate is high and the update of the reference biometric data with this temporary biometric data is permitted. In this case, an update request signal, together with the temporary biometric data selected as the update candidate and the corresponding user ID, is output from the update requesting unit 127 to the reference-data managing unit 113.

The threshold value(s) compared in operation S59 may be arbitrarily settable in response to a request from the automatic update setting unit 311 in the management terminal 300. With this arrangement, the administrator can adjust the quality of the updated reference biometric data by changing the criteria for the update determination.

In the above-described processing in FIG. 12, when temporary biometric data having a quality that is equivalent to that of the registered reference biometric data exists, the reference biometric data is updated with the temporary biometric data. In particular, the update processing is executed using temporary biometric data having an FAR that is equivalent to that of the reference biometric data. This arrangement, therefore, allows the reference biometric data to be automatically updated according to aging of the user's biometric information and allows the probability of false authentication with another user's reference biometric data to be maintained low.

In the embodiment described above, the threshold Th in the verification score distributions is variably set to determine ROC curves from the verification score distributions. In an embodiment, correlations are determined on the basis of the approximate curves included in the verification score distributions. Thus, in an embodiment, the distribution characteristics of the verification scores are more accurately reflected in the evaluation of the qualities of the temporary biometric data. In this respect, it can be said that the accuracy of the quality evaluation in an embodiment is high. In contrast, in the above-identified embodiment, as the resolution of the threshold Th for determining the ROC curves is increased, the accuracy of the quality evaluation improves.

In an embodiment, however, the quality of the updated reference biometric data is substantially equal to the pre-update reference biometric data. In contrast, the above described embodiment offers an advantage in that the quality of the updated reference biometric data is more likely to be higher than the quality of the pre-update reference biometric data.

In the embodiments described above, the user's own temporary biometric data and reference biometric data are used to perform verification simulation. In contrast, other users' reference biometric data registered in the temporary-data storage unit 132 may also be used to perform verification simulation, as described below with reference to FIGS. 13 and 14.

Figure 13:
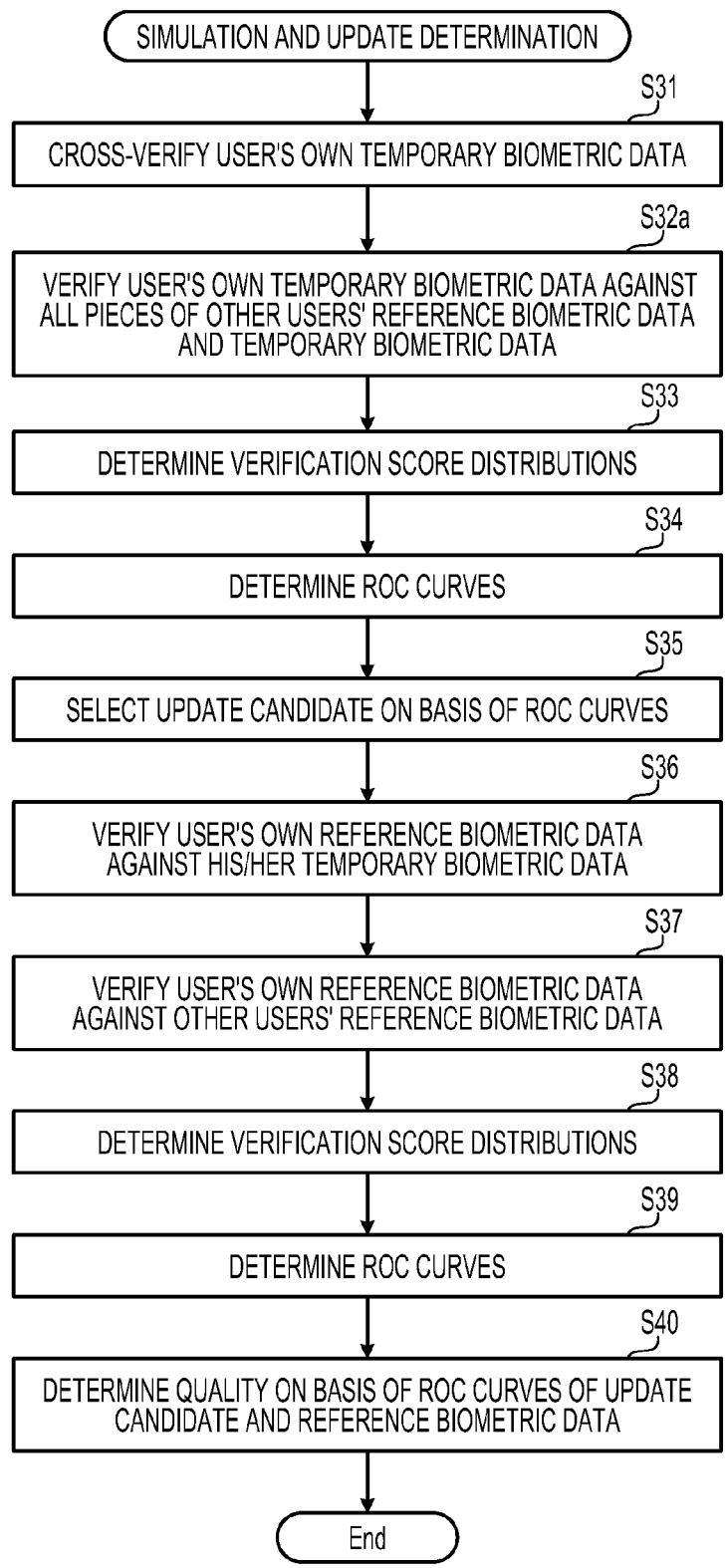
FIG. 13 is a flowchart of a procedure of verification-simulation and update-determination processing performed by a biometric authentication server according to an embodiment.
Figure 14:
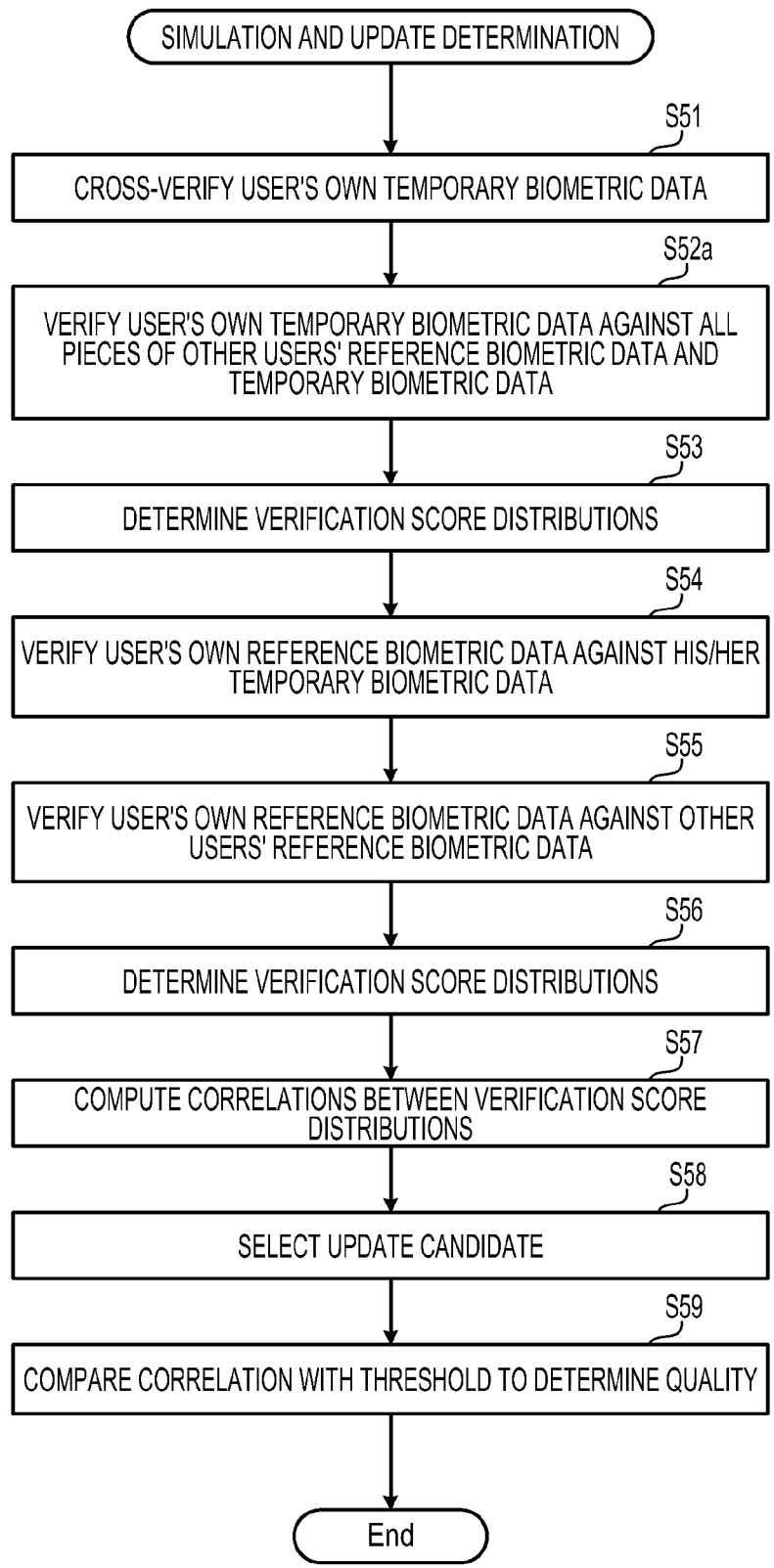
FIG. 14 is a flowchart of a procedure of verification-simulation and update-determination processing performed by a biometric authentication server according to an embodiment.

FIG. 13 is a flowchart illustrating a procedure of verification-simulation and update-determination processing performed by the biometric authentication server according to an embodiment. FIG. 14 is a flowchart illustrating a procedure of verification-simulation and update-determination processing performed by the biometric authentication server according to an embodiment.

In the flowchart illustrated in FIG. 13, processing operations in which the same processing as that in FIG. 8 is performed are denoted by the same reference characters. The processing illustrated in FIG. 13 is different from the processing in FIG. 8 in that operation S32a is executed instead of operation S32. In the flowchart illustrated in FIG. 14, processing operations in which the same processing as that in FIG. 12 is performed are denoted by the same reference characters. The processing illustrated in FIG. 14 is different from the processing in FIG. 12 in that operation S52a is executed instead of operation S52.

In both operation S32a in FIG. 13 and operation S52a in FIG. 14, processing as follows is executed. The simulation unit 124, for example, verifies one of the pieces of the user's own temporary biometric data registered in the temporary-data storage unit 132 against each of all pieces of the reference biometric data stored in the reference-data storage unit 131. In addition, the simulation unit 124 verifies the same temporary biometric data against each of all pieces of the other users' temporary biometric data registered in the temporary-data storage unit 132. The simulation unit 124 then calculates verification scores based on all combinations of those pieces of biometric data. In the above-described processing, Q+(R-P) verification scores are calculated, where R indicates the number of all pieces of the temporary biometric data registered in the temporary-data storage unit 132.

The simulation unit 124 further performs the above-described computation on all pieces of the user's own temporary biometric data registered in the temporary-data storage unit 132. As a result, P verification score groups, each including Q+(R-P) verification scores, are determined.

Through such processing, the verification simulation is performed using future update candidates for other users' reference biometric data registered in the temporary-data storage unit 132. As a result, it is possible to prevent the FAR of the user's own reference biometric data from becoming high when other users' reference biometric data are updated after the user's own reference biometric data is updated.

According to an embodiment described below, and in any of the above described embodiments, a user who is likely to be falsely authenticated is automatically identified through verification simulation based on temporary biometric data with which the authentication was unsuccessful. The identified user is then determined as a user to be subjected to automatic update processing.

A biometric authentication system according to the present embodiment has a system configuration that is similar to the system configuration in FIG. 2 and also includes apparatuses having hardware configurations that are similar to the above described embodiments. In addition, a biometric authentication server in the present embodiment essentially has a function that is the same as the biometric authentication server 100 illustrated in FIG. 4.

However, the temporary-data reporting unit 115 reports, to the temporary-data obtaining unit 121, not only the temporary biometric data with which the authentication was successful but also the temporary biometric data with which the authentication was unsuccessful. The temporary-data obtaining unit 121 is adapted to be capable of determining whether the reported temporary biometric data is data with which the authentication was successful or data with which the authentication was unsuccessful.

Figure 15:
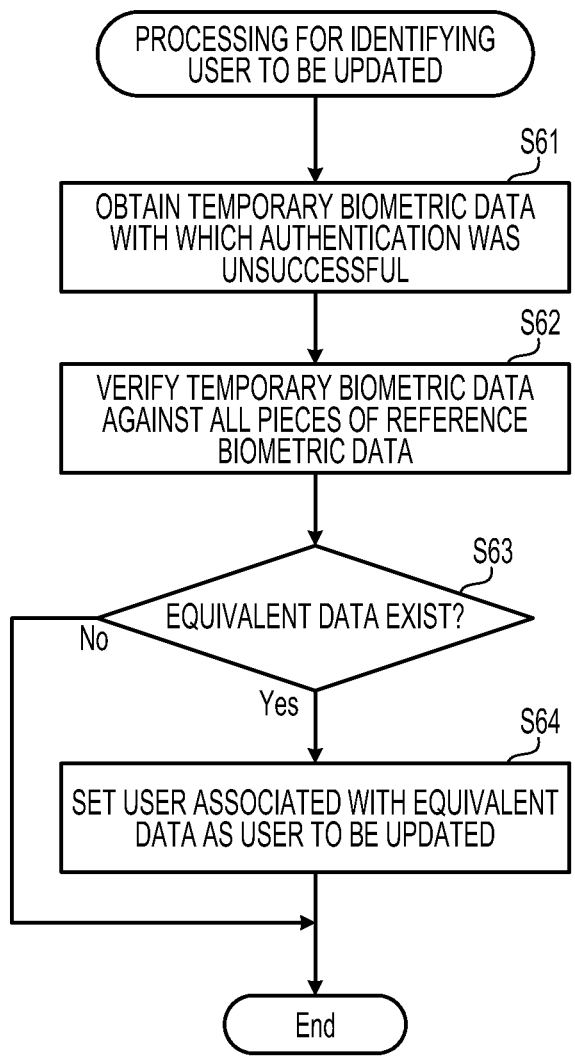
FIG. 15 is a flowchart illustrating a procedure of processing for identifying a user to be updated.

FIG. 15 is a flowchart illustrating a procedure of processing for identifying a user to be updated.

In operation S61, the temporary-data obtaining unit 121 obtains, from the temporary-data reporting unit 115, the temporary biometric data with which the authentication was unsuccessful, and outputs the obtained temporary biometric data to the simulation unit 124.

In operation S62, the simulation unit 124 verifies the temporary biometric data with which the authentication was unsuccessful against all pieces of the reference biometric data registered in the reference-data storage unit 131, to thereby calculate verification scores. The simulation unit 124 then compares the verification scores with a predetermined lower-limit threshold. This lower-limit threshold may be arbitrarily settable by, for example, processing in the automatic update setting unit 311 in the management terminal 300.

In operation S63, the simulation unit 124 determines whether or not reference biometric data having a verification score that is larger than or equal to the lower-limit threshold exists (determination of whether equivalent data exists is made). When such reference biometric data exists, processing in operation S64 is executed. On the other hand, when such reference biometric data does not exists, the processing ends.

In operation S64, the simulation unit 124 reports, to the temporary-data storage processing unit 122, the user ID associated with the reference biometric data having a verification score that is larger than or equal to the lower-limit threshold. The temporary-data storage processing unit 122 sets the reported user ID as an ID to be automatically updated.

After the execution of operation S64, when the temporary-data obtaining unit 121 obtains temporary biometric data with which the authentication was successful, the temporary-data storage processing unit 122 identifies a user ID associated with the obtained temporary biometric data. When the user ID has already been set as an ID to be automatically updated, the temporary-data storage processing unit 122 registers the temporary biometric data in the temporary-data storage unit 132.

In the above-described processing, the arrangement may also be such that processing in operation S64 is executed when it is determined in operation S63 that multiple pieces of reference biometric data having verification scores that are larger than or equal to the lower-limit threshold exist. Such an arrangement can reduce the possibility that reference biometric data of a user associated with the temporary biometric data with which the authentication was unsuccessful is set as reference biometric data to be updated.

In addition, when an authentication method based on one-to-one matching is employed, the user ID of the temporary biometric data with which the authentication was unsuccessful can be identified. Accordingly, for example, in operation S62, of the data registered in the reference-data storage unit 131, the reference biometric data of user IDs other than the user ID associated with the temporary biometric data with which the authentication was unsuccessful may be used to calculate verification scores.

In the above-described processing, when it is determined in operation S63 that the verification score is larger than or equal to the lower-limit threshold, it can be regarded that another user's reference biometric data that is similar to the user's own temporary biometric data exists. Thus, if the reference biometric data determined to be similar to the user's own temporary biometric data is not to be updated, false recognition can occur later on. Accordingly, in the above-described processing, such reference biometric data is extracted in advance and the user associated therewith is identified as a user to be automatically updated. As a result, the probability of occurrence of false recognition can be reduced.

Figure 16:
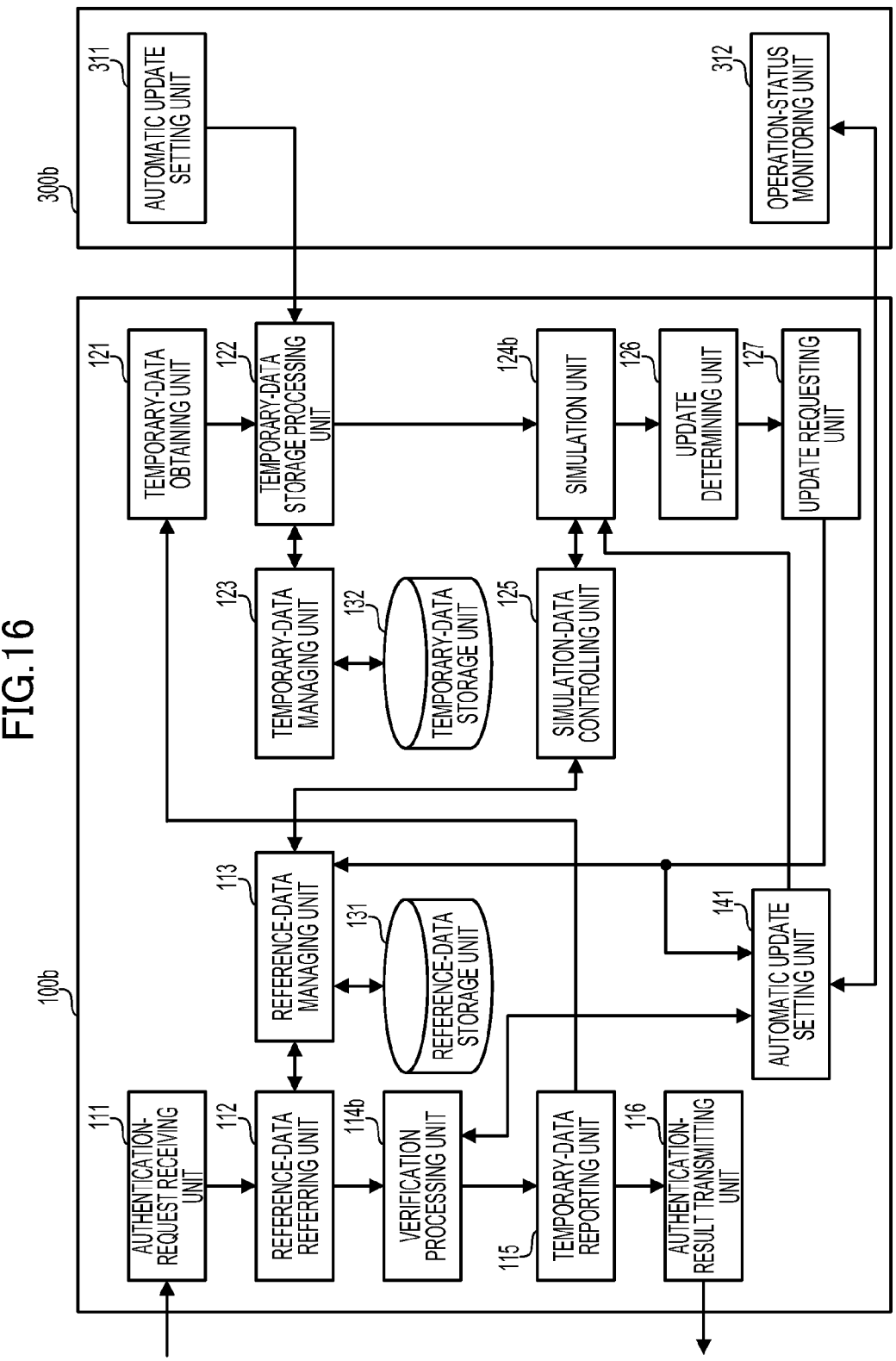
FIG. 16 is a diagram illustrating an example of the configuration of a biometric authentication system according to an embodiment.

FIG. 16 is a diagram illustrating an example of the configuration of a biometric authentication system according to an embodiment. In FIG. 16, elements corresponding to those in FIG. 4 are denoted by the same reference numerals, and descriptions thereof are not given hereinafter.

A biometric authentication server 100b illustrated in FIG. 16 has a verification processing unit 114b and a simulation unit 124b instead of the verification processing unit 114 and the simulation unit 124 in the configuration of the biometric authentication server 100 illustrated in FIG. 4. The biometric authentication server 100b further has an operation managing unit 141. A management terminal 300b illustrated in FIG. 16 has a configuration in which an operation-status monitoring unit 312 is further provided in the management terminal 300 illustrated in FIG. 4. The verification processing unit 114b, the simulation unit 124b, and the operation managing unit 141 are realized by, for example, a predetermined program executed by the CPU in the biometric authentication server 100b. The operation-status monitoring unit 312 is realized by, for example, a predetermined program executed by the CPU provided in the management terminal 300b.

The verification processing unit 114b performs processing that is analogous to the processing of the verification processing unit 114 illustrated in FIG. 4. Each time the temporary biometric data to be verified against the reference biometric data is received, the verification processing unit 114b issues a notification indicating the receiving of the temporary biometric data to the operation managing unit 141.

In response to the notification issued from the verification processing unit 114b, the operation managing unit 141 monitors a status of access for the authentication processing, the access being made to the biometric authentication server 100b. In accordance with the status of access, the operation managing unit 141 notifies the simulation unit 124b about verification-simulation execution timing. For example, the operation managing unit 141 causes the processing of the simulation unit 124b to be executed in a period in which the number of accesses for the authentication processing is not high.

The "verification-simulation execution timing" as used herein refers to timing at which, for example, the simulation unit 124b actually starts execution of processing when the temporary-data storage processing unit 122 determines that the verification-simulation start condition is satisfied. Thus, the processing start timing of the simulation unit 124b is controlled by the operation managing unit 141 in addition to the temporary-data storage processing unit 122. In the present embodiment, as an example of information indicating the execution timing, an execution-enable signal is output from the operation managing unit 141 to the simulation unit 124b.

The operation managing unit 141 can also report the status of access for the authentication processing to the operation-status monitoring unit 312 in the management terminal 300b. Additionally, in response to a request from the operation-status monitoring unit 312, the operation managing unit 141 can also notify the simulation unit 124b about the verification simulation execution timing.

The operation managing unit 141 further has a function for receiving, when the update requesting unit 127 requests the reference-data managing unit 113 to update the reference biometric data, the user ID associated with the reference biometric data and for transmitting the user ID to the operation-status monitoring unit 312 in the management terminal 300b.

The operation-status monitoring unit 312 in the management terminal 300b has a function for receiving information transmitted from the operation managing unit 141 in the biometric authentication server 100b and for reporting the contents of the information to the administrator. For example, the operation-status monitoring unit 312 generates display information for displaying the received information and outputs the display information on a monitor coupled to the management terminal 300b.

Additionally, in response to an operation input performed by the administrator, the operation-status monitoring unit 312 may also notify the operation managing unit 141 in the biometric authentication server 100b about the verification-simulation execution timing.

Such a function of the management terminal 300b allows the administrator to know the operation status of the biometric authentication server 100b. For example, the administrator can know the state of load of the authentication processing at the biometric authentication server 100b. In this case, the timing for the verification-simulation and update-determination processing can be adjusted depending upon the state of load of the authentication processing, as described below.

In addition, the administrator can know that the reference biometric data has been updated and also can identify a user who has been updated. In this case, the result of the processing performed by the verification processing unit 114b may also be reported from the operation managing unit 141 to the operation-status monitoring unit 312. With this arrangement, for example, the administrator can check, for each individual user, changes in the rate of matching before and after the update of the reference biometric data and can verify the effect of the update.

Figure 17:
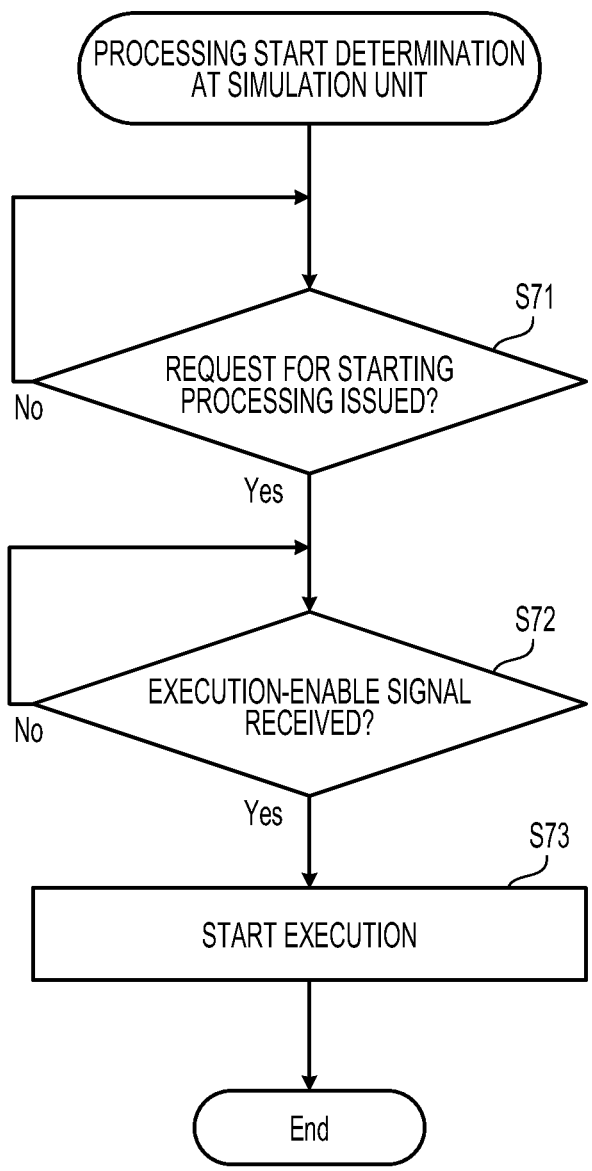
FIG. 17 is a flowchart illustrating a procedure of processing-start determination processing performed by a simulation unit.

FIG. 17 is a flowchart illustrating a procedure of the processing-start determination processing performed by the simulation unit.

In operation S71, the simulation unit 124b determines whether or not a request for starting the processing is issued from the temporary-data storage processing unit 122.

As described above, in operation S23 in FIG. 6, the temporary-data storage processing unit 122 determines whether or not the condition for starting the verification-simulation and update-determination processing is satisfied. In this case, when the processing start condition is satisfied, the request for starting the processing is issued to the simulation unit 124b. At the same time, temporary biometric data to be processed is read from the temporary-data storage unit 132 and is supplied to the simulation unit 124b.

When the request for starting the processing is issued to the simulation unit 124b in the manner described above, processing in operation S72 is executed.

In operation S72, the simulation unit 124b determines whether or not the execution-enable signal is received from the operation managing unit 141. When the execution-enable signal is not received, the simulation unit 124b waits to receive the signal.

When the status of access for the authentication processing indicates that the amount of load of the authentication processing is relatively small, the operation managing unit 141 outputs the execution-enable signal to the simulation unit 124b. For example, the operation managing unit 141 counts the number of accesses for the authentication processing at intervals of a certain time. When the number of accesses in the certain time is smaller than or equal to a predetermined threshold, the operation managing unit 141 outputs the execution-enable signal.

When the execution-enable signal is output to the simulation unit 124b in such a manner, processing in operation S73 is executed.

In operation S73, the simulation unit 124b starts execution of the verification simulation. Thus, the simulation unit 124b starts the verification simulation, and the update determining unit 126 and the update requesting unit 127 also start the update determination processing based on the result of the verification simulation.

According to the above-described processing, automatic update processing for the reference biometric data can be executed under a situation in which the amount of load of the verification processing performed by the verification processing unit 114b is small. Accordingly, the reference biometric data can be updated with high-accuracy temporary biometric data, without any special influence on the authentication processing performance of the biometric authentication server 100b.

Although a case in which the entire processing of the verification simulation and the update determination is started based on the execution-enable signal has been described in the above example of the processing, the verification-simulation and update-determination processing may be intermittently executed in response to the execution-enable signal. Such an arrangement makes it possible to further reduce the amount of load of the processing performed by the biometric authentication server 100b.

The execution-enable signal may be output in response to a request from the operation-status monitoring unit 312 in the management terminal 300b. Such an arrangement also allows the administrator to perform an operation to adjust the processing load of the biometric authentication server 100b in accordance with, for example, the status of access for the authentication processing. In addition, such an arrangement makes it possible to stop automatic update of the reference biometric data during system maintenance and so on.

FIG. 18 is a table illustrating one example of operation-status monitoring information displayed on the management terminal.

In the processing performed by the operation-status monitoring unit 312, operation-status monitoring information 312a illustrated in FIG. 18 is displayed on a monitor coupled to the management terminal 300b. The operation-status monitoring information 312a is management information that the administrator uses to check the verification processing load in one day, and includes the number of executions of the verification processing for each time period in increments of one hour.

The operation-status monitoring information 312a further includes execution setting information for each time period. The execution setting information can be set in accordance with an operation input performed by the administrator and is information for notifying the operation managing unit 141 in the biometric authentication server 100b as to whether or not the verification-simulation and update-determination processing can be executed.

For example, when the execution setting information indicates "enable", the operation managing unit 141 outputs the execution-enable signal to the simulation unit 124b in accordance with the verification processing load. When the execution setting information indicates "disable", the outputting of the execution-enable signal from the operation managing unit 141 is prohibited. When the execution setting information indicates "M", this means that the biometric authentication server 100b is in a maintenance period. In this case, the outputting of the execution-enable signal from the operation managing unit 141 is also prohibited.

The use of the operation-status monitoring information 312a allows the administrator of the biometric authentication server 100b to arbitrarily set the timing for the verification-simulation and update-determination processing at the biometric authentication server 100b.

Of the functions included in the biometric authentication servers in the embodiments described above, the function for executing the authentication processing and the function for updating the reference biometric data may be realized by independent apparatuses. For example, in FIG. 4, the functions of the temporary-data obtaining unit 121, the temporary-data storage processing unit 122, the temporary-data managing unit 123, the simulation unit 124, the simulation-data controlling unit 125, the update determining unit 126, the update requesting unit 127, and the temporary-data storage unit 132 may be provided in a data update control apparatus that is independent from the biometric authentication server 100. In such a case, the biometric authentication server 100 and the data update control apparatus are interconnected through a network or the like to perform data transmitted/received therebetween. With such an arrangement, the data registered in the reference-data storage unit 131 can be updated without any influence on the authentication processing performance of the biometric authentication server.

When the biometric authentication server and the data update control apparatus are provided independently from each other as described above, a configuration as described below and illustrated in FIG. 19 may be employed.

Figure 19:
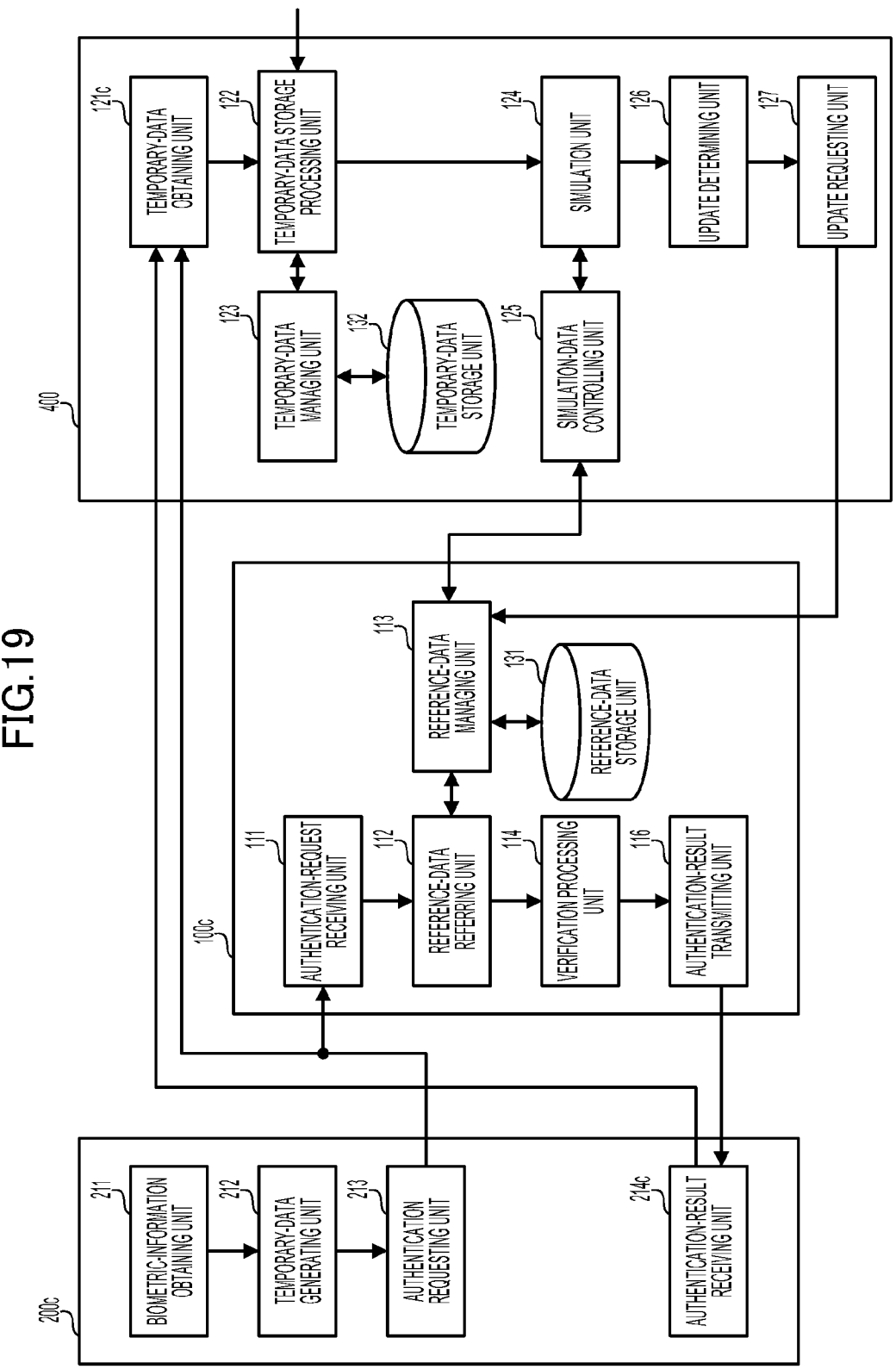
FIG. 19 is a diagram illustrating a system configuration of a biometric authentication system according to an embodiment and functions of apparatuses in the biometric authentication system.

FIG. 19 is a diagram illustrating the system configuration of a biometric authentication system according to an embodiment and the functions of apparatuses in the biometric authentication system. In FIG. 19, elements corresponding to those in FIG. 4 are denoted by the same reference numerals, and descriptions thereof are not given hereinafter.

As illustrated in FIG. 19, the biometric authentication system according to the present embodiment includes at least one biometric authentication terminal 200c, a biometric authentication server 100c, and a data update control apparatus 400, which are interconnected through, for example, a network or the like.

The biometric authentication terminal 200c has a configuration in which an authentication-result receiving unit 214c is provided instead of the authentication-result receiving unit 214 in the biometric authentication terminal 200 illustrated in FIG. 4. The authentication-result receiving unit 214c receives an authentication result from the authentication-result transmitting unit 116 in the biometric authentication server 100c. The authentication-result receiving unit 214c then transmits the authentication result to a temporary-data obtaining unit 121c included in the data update control apparatus 400.

The authentication requesting unit 213 transmits the information, transmitted to the authentication-request receiving unit 111 in the biometric authentication server 100 in FIG. 4, not only to the authentication-request receiving unit 111 in the biometric authentication server 100c but also to the temporary-data obtaining unit 121c in the data update control apparatus 400.

The biometric authentication server 100c has, of the functions included in the biometric authentication server 100 in FIG. 4, the authentication-request receiving unit 111, the reference-data referring unit 112, the reference-data managing unit 113, the verification processing unit 114, the authentication-result transmitting unit 116, and the reference-data storage unit 131. In this case, however, data is directly passed from the verification processing unit 114 to the authentication-result transmitting unit 116.

On the other hand, the data update control apparatus 400 has, of the functions included in the biometric authentication server 100 in FIG. 4, the temporary-data storage processing unit 122, the temporary-data managing unit 123, the temporary-data storage unit 132, the simulation unit 124, the simulation-data controlling unit 125, the update determining unit 126, and the update requesting unit 127. The data update control apparatus 400 further has the temporary-data obtaining unit 121c, as noted above.

The temporary-data obtaining unit 121c essentially has the same function as that of the temporary-data obtaining unit 121 provided in the biometric authentication server 100 in FIG. 4. The temporary-data obtaining unit 121c, however, receives the temporary biometric data from the authentication requesting unit 213, regardless of whether or not the authentication was successful. The temporary-data obtaining unit 121c also receives the authentication result from the authentication-result receiving unit 214c.

Upon receiving the temporary biometric data from the authentication requesting unit 213, the temporary-data obtaining unit 121c waits for the authentication result transmitted from the authentication-result receiving unit 214c. When the temporary-data obtaining unit 121c receives the authentication result and the received authentication result indicates that the received temporary biometric data is data with which the authentication was successful, the temporary-data obtaining unit 121c passes the temporary biometric data and the user ID to the temporary-data storage processing unit 122. Consequently, the temporary biometric data with which the authentication was successful is stored in the temporary-data storage unit 132. Thereafter, the data update control apparatus 400 executes processing for updating the data registered in the reference-data storage unit 131 in the biometric authentication server 100c.

When an authentication method based on one-to-one matching is employed, the user ID is transmitted from the authentication requesting unit 213 to the temporary-data obtaining unit 121c, and when an authentication system based on one-to-many matching is employed, the user ID is transmitted from the authentication-result receiving unit 214c to the temporary-data obtaining unit 121c. Alternatively, the user ID may be always transmitted from the authentication-result receiving unit 214c to the temporary-data obtaining unit 121c.

In the above-described configuration, the data update control apparatus 400 executes processing for updating the data registered in the reference-data storage unit 131, independently from the biometric authentication processing performed by the biometric authentication server 100c. Thus, the data registered in the reference-data storage unit 131 can be updated without any influence on the authentication processing performance of the biometric authentication server 100c.

Although not illustrated, the management terminal 300 illustrated in FIG. 4 may be coupled to the data update control apparatus 400 in the configuration illustrated in FIG. 19. The management terminal 300 may be configured to be able to execute setting for the individual processing in the data update control apparatus 400.

Figure 20:
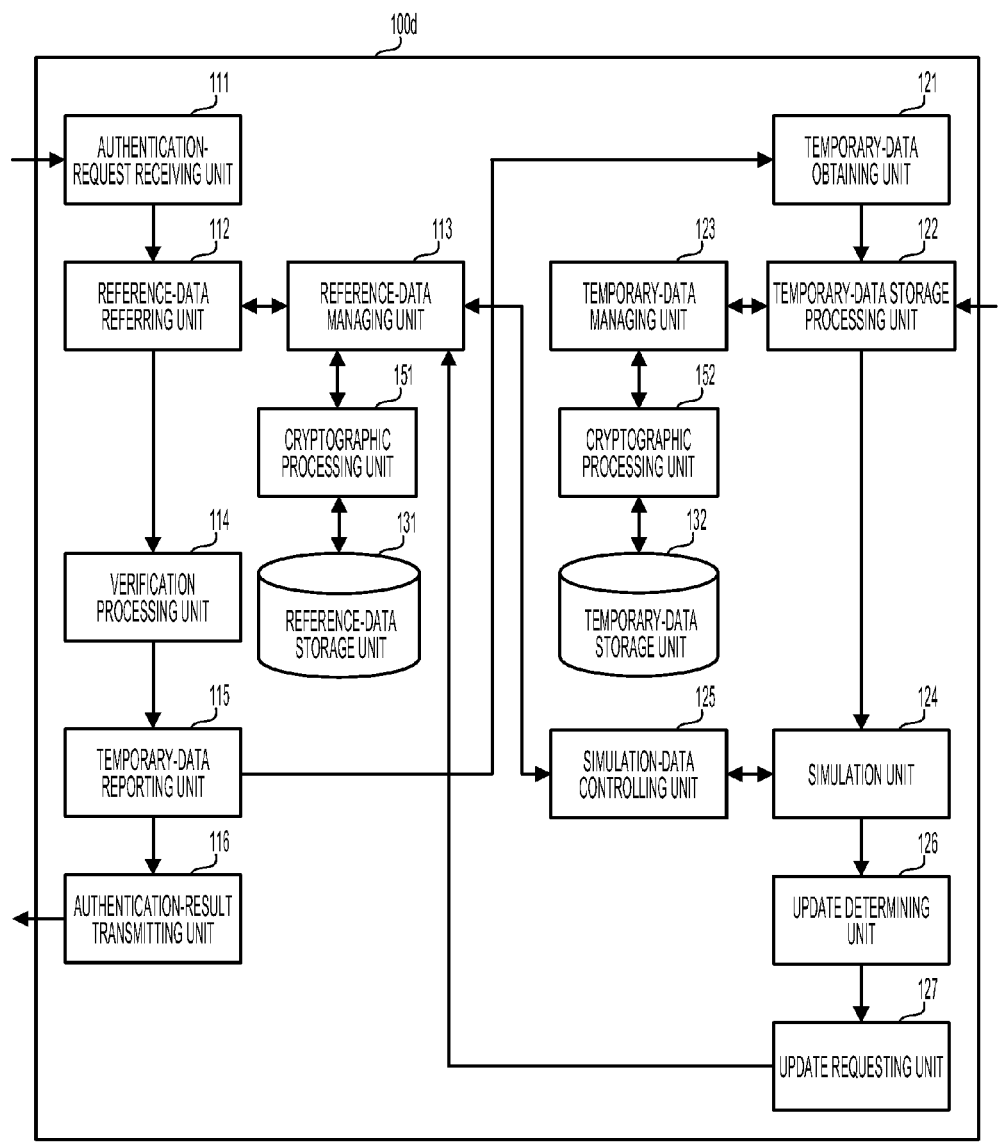
FIG. 20 is a diagram illustrating an example of a configuration of a biometric authentication server according to an embodiment.

FIG. 20 is a diagram illustrating an example of the configuration of a biometric authentication server according to an embodiment. In FIG. 20, elements corresponding to those in FIG. 4 are denoted by the same reference numerals, and descriptions thereof are not given hereinafter.

A biometric authentication server 100d illustrated in FIG. 20 has a configuration in which cryptographic processing units 151 and 152 are further provided in the biometric authentication server 100 illustrated in FIG. 4.

The cryptographic processing unit 151 encrypts data to be recorded from the reference-data managing unit 113 to the reference-data storage unit 131. The cryptographic processing unit 151 also decrypts data read from the reference-data storage unit 131 to the reference-data managing unit 113. Similarly, the cryptographic processing unit 152 encrypts data to be recorded from the temporary-data managing unit 123 to the temporary-data storage unit 132. The cryptographic processing unit 152 also decrypts data read from the temporary-data storage unit 132 to the temporary-data managing unit 123.

The cryptographic processing units 151 and 152 prevent tampering of the registered reference biometric data and the stored temporary biometric data, respectively. Consequently, it is possible to further improve the accuracy of the biometric authentication and it is possible to enhance the security of the biometric authentication.

The biometric authentication server 100b illustrated in FIG. 16 or the biometric authentication server 100c and the data update control apparatus 400 illustrated in FIG. 19 may also have a cryptographic processing function that is similar to the function illustrated in FIG. 20. Such an arrangement can prevent tampering of the reference-data storage unit 131 and the temporary-data storage unit 132 illustrated in FIGS. 16 and 19 and also can enhance the security of the biometric authentication.

Figure 21:
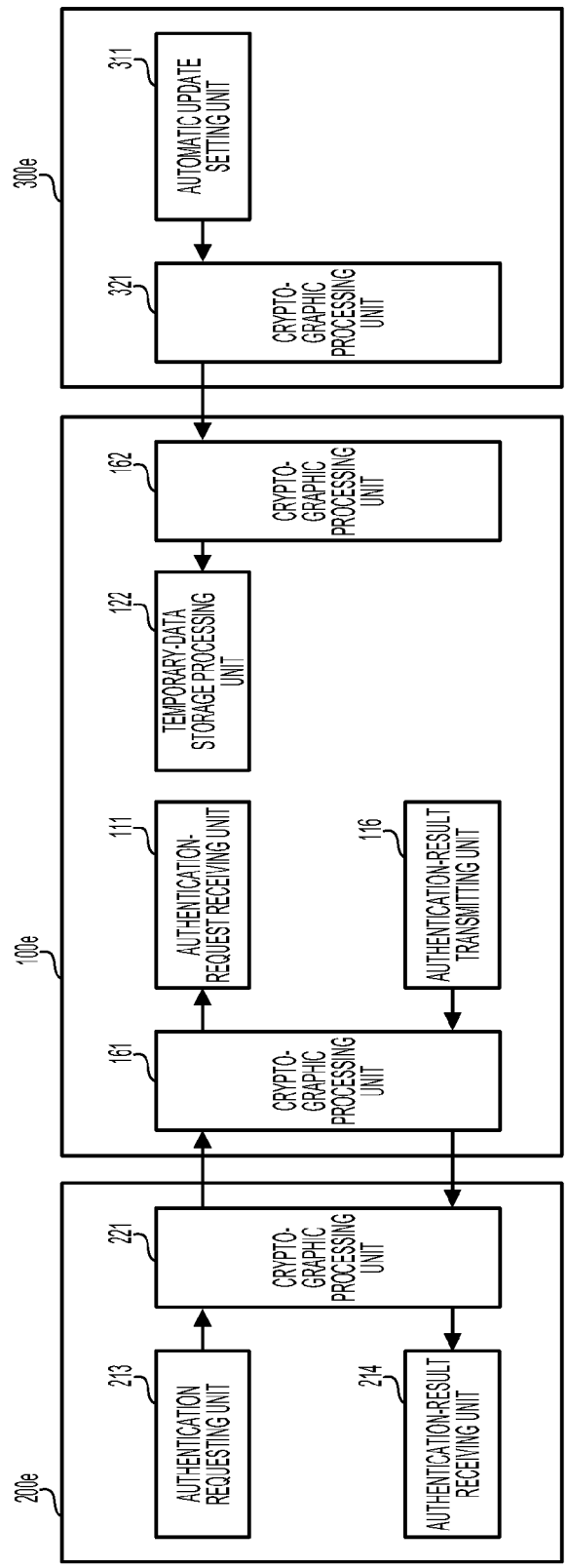
FIG. 21 is a diagram illustrating an example of a configuration of a biometric authentication system according to an embodiment.

FIG. 21 is a diagram illustrating an example of the configuration of a biometric authentication system according to an embodiment. In FIG. 21, elements corresponding to those in FIG. 4 are denoted by the same reference numerals, and descriptions thereof are not given hereinafter.

A biometric authentication system illustrated in FIG. 21 has a configuration in which cryptographic processing units 161, 162, 221, and 321 are further provided in the biometric authentication system illustrated in FIG. 4. That is, a biometric authentication terminal 200e has the cryptographic processing unit 221 in addition to all of the functions of the biometric authentication terminal 200 illustrated in FIG. 4. A biometric authentication server 100e has the cryptographic processing units 161 and 162 in addition to all of the functions of the biometric authentication server 100 illustrated in FIG. 4. A management terminal 300e has the cryptographic processing unit 321 in addition to all of the functions of the management terminal 300 illustrated in FIG. 4.

Each of the cryptographic processing units 161, 162, 221, and 321 encrypts part of all of data to be transmitted from the internal unit in the corresponding apparatus to the external apparatus through the network. In addition, each of the cryptographic processing units 161, 162, 221, and 321 decrypts part of all of data received from the external apparatus through the network and passes the decrypted data to the internal unit in the corresponding apparatus. As a result of such processing, the integrity of the data exchanged between the apparatuses improves and the reliability of the processing in each apparatus increases.

For example, data to be transmitted from the biometric authentication terminal 200e to the biometric authentication server 100e is encrypted by the cryptographic processing unit 221 and the encrypted data is then transmitted through the network. The encrypted data is decrypted by the cryptographic processing unit 161 in the biometric authentication server 100e and the decrypted data is output to the authentication-request receiving unit 111. Consequently, impersonation for biometric information used for the authentication is prevented, the security of the authentication processing improves, and moreover, the reliability of the processing for updating the reference biometric data improves.

Data to be transmitted from the authentication-result transmitting unit 116 to the biometric authentication terminal 200e is encrypted by the cryptographic processing unit 161 and the encrypted data is the transmitted through the network. The encrypted data is decrypted by the cryptographic processing unit 221 in the biometric authentication terminal 200e and the decrypted data is output to the authentication-result receiving unit 214. Consequently, the integrity of the authentication result improves.

Data to be transmitted from the automatic update setting unit 311 in the management terminal 300e to the biometric authentication server 100e is encrypted by the cryptographic processing unit 321 in the management terminal 300e and the encrypted data is the transmitted through the network. The encrypted data is decrypted by the cryptographic processing unit 162 in the biometric authentication server 100e and the decrypted data is output to, for example, the temporary-data storage processing unit 122. This arrangement prevents an event in which the automatic update processing at the biometric authentication server 100e is intentionally altered and the integrity of the registered information such as the reference biometric data declines.

For example, in the system configuration illustrated in FIG. 19, part or all of the data transmitted/received between the apparatuses may be encrypted.

At least one of the functions of the apparatuses included in the above-described biometric authentication system may be realized by a computer. In such a case, a program in which the contents of the processing of the function(s) are written is supplied. When the program is executed by the computer, the above-described processing function(s) is realized on the computer. The program in which the contents of the processing are written may be recorded to a computer-readable recording medium. Examples of the computer-readable recording medium include a magnetic recording device, an optical disk, a magneto-optical recording medium, and a semiconductor memory.

For distribution of the program, for example, portable recording media (such as optical disks) on which the program is recorded may be made commercially available. The program may also be stored in a storage device in a server computer so that the program can be transferred therefrom to another computer over a network.

For example, a computer for executing the program stores the program, recorded on the portable recording medium or transferred from the server computer, in a storage device of the computer. The computer then reads the program from the storage device thereof to execute processing according to the program. The computer may also directly read the program from the portable recording medium to execute the processing according to the program. In addition, each time the program is transferred from the server computer, the computer may sequentially execute the processing according to the received program.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention, the scope of which is defined in the claims and their equivalents.

What is claimed is:

1. A biometric-information processing apparatus, comprising:
   a memory; and
   a processor coupled to the memory and configured to execute a process including:
      storing sample biometric information of a user into a second storage unit each time verification of sample biometric information of the user compared against enrolled biometric information registered in a first storage unit succeeds; and
      updating an update candidate among multiple pieces of the user's sample biometric information stored in the second storage unit, where the update candidate is selected as having a lowest false accept rate when compared against enrolled biometric information of other users.

2. The biometric-information processing apparatus according to claim 1, the process comprising:
comparing a result of verification of the sample biometric information selected as the update-candidate biometric information against the other users' enrolled biometric information with a result of verification of the user's enrolled biometric information against the other users' enrolled biometric information and determining, based on a result of the comparison, whether the user's enrolled biometric information is to be updated with the update-candidate biometric information.

3. The biometric-information processing apparatus according to claim 2, the process comprising:
first determining similarity information indicating similarities by verifying the multiple pieces of the user's sample biometric information stored in the second storage unit against the other users' enrolled biometric information; and
second determining the similarity information by verifying the user's enrolled biometric information against the other user's enrolled biometric information;
wherein the update-candidate biometric information is selected, based on a frequency distribution of the similarity information determined by the first determining for each of the multiple pieces of the user's sample biometric information, and
wherein the comparing compares the frequency distribution of the similarity information, determined by the first determining by verifying the sample biometric information selected as the update-candidate biometric information against the other users' enrolled biometric information, with a frequency distribution of the similarity information determined by the second determining, and based on a result of the comparison, the update comparing determines whether the user's enrolled biometric information is to be updated.

4. The biometric-information processing apparatus according to claim 3, the process comprising:
third determining that determines the similarity information by cross-verifying the multiple pieces of the user's sample biometric information stored in the second storage unit,
wherein a false accept rate and a false reject rate is determined for each of the multiple pieces of the user's sample biometric information based on the frequency distribution of the similarity information determined by the first determining for each of the multiple pieces of the user's sample biometric information and a frequency distribution of the similarity information determined by the third determining and selects, as the update-candidate biometric information, the sample biometric information whose false accept rate and false reject rate are lowest.

5. The biometric-information processing apparatus according to claim 4, the process comprising:
fourth determining that determines the similarity information by verifying the user's sample biometric information stored in the second storage unit against the user's enrolled biometric information,
wherein, based on the frequency distribution of the similarity information determined by the second determining and a frequency distribution of the similarity information determined by the fourth determining, the comparing determines a false accept rate and a false reject rate of the user's verification subject biometric information, and when the determined false accept rate and false reject rate are higher than the false accept rate and the false reject rate of the sample biometric information selected as the update-candidate biometric information, the comparing determines that the user's enrolled biometric information is to be updated.

6. The biometric-information processing apparatus according to claim 5, wherein, when the sample biometric information is verified against the enrolled biometric information to perform the authentication processing, an arbitrary value of the similarity information on the frequency distribution of the similarity information is set as a virtual threshold for determining whether the sample biometric information is the user's sample biometric information, calculates the false accept rate and the false reject rate for each of the multiple pieces of the user's sample biometric information while varying the threshold, determines approximate curves for the respective pieces of the sample biometric information by plotting the calculated false accept rates and the false reject rates on coordinate plane and performing function approximation, and selects, as the update-candidate biometric information, the sample biometric information corresponding to the approximate curve that is closest to an origin on the coordinate plane; and
the comparing calculates the false accept rate and the false reject rate of the user's enrolled biometric information while varying the threshold, determines an approximate curve based on the calculated false accept rates and false reject rates of the user's enrolled biometric information, and when the approximate curve corresponding to the sample biometric information selected as the update-candidate biometric information is closer to the original on the coordinate plane than the approximate curve determined based on the false accept rates and false reject rates of the user's enrolled biometric information, the comparing determines that the user's enrolled biometric information is to be updated.

7. The biometric-information processing apparatus according to claim 6, wherein, when two approximate curves intersect, a first divided region is selected as a divided region having a largest area from divided regions obtained by dividing regions, defined by the approximate curves, with an intersection point thereof; and
when a difference between an area of the first divided region and an area of an adjacent second divided region whose false accept rate is lower than the first divided region is smaller than or equal to a predetermined value, the approximate curve whose false reject rate is lower in the second divided region is preferentially selected.

8. The biometric-information processing apparatus according to claim 4, wherein, when the false accept rate of the sample biometric information selected as the update-candidate biometric information is lower than or equal to a predetermined upper-limit threshold, the sample biometric information is output to the comparing and causes the comparing to execute update determination processing.

9. The biometric-information processing apparatus according to claim 3, the process comprising:
selecting, from the frequency distributions of the first similarity information determined by the first determining for the multiple pieces of the multiple pieces of the user's sample biometric information, a frequency distribution having a highest correlation with the frequency distribution of the similarity information determined by the second determining, and selects, as the update-candidate biometric information, the sample biometric information corresponding to the selected frequency distribution; and when a correlation between the selected frequency distribution and the frequency distribution of the similarity information determined by the second determining exceeds a predetermined threshold, the comparing determines that the user's enrolled biometric information is to be updated.

10. The biometric-information processing apparatus according to claim 9, the process comprising:

third determining that determines the similarity information by cross-verifying the multiple pieces of the user's sample biometric information stored in the second storage unit, and fourth determining that determines the similarity information by verifying the user's sample biometric information stored in the second storage unit against the user's enrolled biometric information;

wherein, when a correlation between the selected frequency distribution and the frequency distribution of the similarity information determined by the second determining exceeds a predetermined first threshold and a correlation between a frequency distribution of the similarity information determined by the third determining and a frequency distribution of the similarity information determined by the fourth determining exceeds a second threshold value, the comparing determines that the user's enrolled biometric information is to be updated.

11. The biometric-information processing apparatus according to claim 3, the process comprising:

third determining that determines, when the biometric authentication processing is executed and sample biometric information with which the authentication was unsuccessful is obtained, the similarity information by verifying the obtained sample biometric information against, of the enrolled biometric information registered in the first storage unit, at least the enrolled biometric information of the users other than the user associated with the obtained sample biometric information; and as the user for which the sample biometric information with which the authentication was successful is stored in the second storage unit, a user is associated with the enrolled biometric information whose similarity information determined by the third determining is larger than or equal to a predetermined lower-limit threshold value.

12. The biometric-information processing apparatus according to claim 3, wherein the first determining determines the similarity information by verifying the multiple pieces of the user's sample biometric information stored in the second storage unit against the other users' enrolled biometric information and the other users' sample biometric information stored in the second storage unit.

13. The biometric-information processing apparatus according to claim 1, the process comprising:

updating the user's enrolled biometric information, registered in the first storage unit, with the update-candidate biometric information selected.

14. The biometric-information processing apparatus according to claim 1, wherein the second storage unit stores, the sample biometric information together with time information indicating time when the biometric authentication processing is executed; and the update-candidate biometric information is selected from, of the user's sample biometric information stored in the second storage unit, the sample biometric information having time information indicates time in a certain period.

15. The biometric-information processing apparatus according to claim 1, the process comprising:

executing the biometric authentication processing; and prohibiting execution of the biometric authentication processing when a value indicating a processing load exceeds a predetermined value.

16. The biometric-information processing apparatus according to claim 15, the process comprising:

outputting information indicating the processing load of the executing of the biometric authentication processing to an external apparatus, and wherein execution of the processing of the selecting is prohibited in accordance with control performed by the external apparatus.

17. A biometric-information processing method, comprising:

storing sample biometric information of a user each time verification of sample biometric information of the user compared against enrolled biometric information registered in a first storage unit succeeds, the user's sample biometric information being stored in a second storage unit; and an update candidate among multiple pieces of the user's sample biometric information stored in the second storage unit, where the update candidate is selected as having a lowest false accept rate when compared against enrolled biometric information of other users.

18. A computer-implemented method, comprising:

receiving biometric information;

storing the biometric information when each comparison against stored enrolled biometric information registered results in a match; and selecting an update-candidate among multiple pieces of biometric information of a user and updating the update-candidate, where the update-candidate is selected as having a lowest false accept rate when compared to stored multiple pieces of biometric information of other users.

* * * * *